(12) United States Patent
Futaki et al.

(10) Patent No.: US 12,432,619 B2
(45) Date of Patent: *Sep. 30, 2025

(54) METHODS AND APPARATUSES FOR TRANSMITTING CONTROL-PLANE MESSAGES IN CELLS USING DIFFERENT RADIO ACCESS TECHNOLOGIES

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 18/204,138

(22) Filed: May 31, 2023

(65) Prior Publication Data
US 2023/0328591 A1    Oct. 12, 2023

Related U.S. Application Data

(63) Continuation of application No. 17/176,770, filed on Feb. 16, 2021, now Pat. No. 11,711,724, which is a
(Continued)

(30) Foreign Application Priority Data

Jan. 8, 2016    (JP) .................................. 2016-002879

(51) Int. Cl.
*H04W 88/06*     (2009.01)
*H04W 24/10*     (2009.01)
(Continued)

(52) U.S. Cl.
CPC ....... *H04W 28/0864* (2023.05); *H04W 24/10* (2013.01); *H04W 76/16* (2018.02); *H04W 88/06* (2013.01)

(58) Field of Classification Search
CPC ...... H04L 69/18; H04W 80/02; H04W 88/16; H04W 88/06
(Continued)

(56) References Cited

U.S. PATENT DOCUMENTS

| 8,897,783 B2 | 11/2014 | Olofsson ........... H04W 36/0079 455/436 |
| 9,537,612 B2 * | 1/2017 | Kodali .................. H04W 24/10 |

(Continued)

FOREIGN PATENT DOCUMENTS

| CN | 103313375 A | 9/2013 |
| CN | 104584633 A | 4/2015 |

(Continued)

OTHER PUBLICATIONS

Icaro Da Silva et al., "Tight integration of new 5G air interface and LTE to fulfill 5G requirements," in Vehicular Technology Conference (VTC Spring), 2015 IEEE 81st, May 11-14, 2015, pp. 1-5.
(Continued)

*Primary Examiner* — John Pezzlo
(74) *Attorney, Agent, or Firm* — Sughrue Mion, PLLC

(57) ABSTRACT

A radio station (2) transmits or receives, to or from a radio terminal (1) in a second cell (23, 24), a CP message containing a NAS message or an RRC message or both, when a predetermined condition is satisfied. The second cell (23, 24) uses a RAT different from that of the first cell, and is used in addition and subordinate to the first cell. The predetermined condition relates to at least one of: (a) a content or type of the CP message; (b) a type of a signalling radio bearer used to transmit the CP message; (c) a transmission cause of the CP message; and (d) a type of a core network associated with the NAS message. It is thus, for example, possible to contributing to efficient transmission of control plane (CP) messages in a radio architecture that
(Continued)

provides interworking of two different Radio Access Technologies (RATs).

8 Claims, 12 Drawing Sheets

Related U.S. Application Data continuation of application No. 16/063,735, filed as application No. PCT/JP2016/087143 on Dec. 14, 2016, now Pat. No. 10,952,099.

(51) Int. Cl.
*H04W 28/086* (2023.01)
*H04W 76/16* (2018.01)
*H04L 69/18* (2022.01)

(58) Field of Classification Search
USPC ..................................... 370/252, 329, 469
See application file for complete search history.

(56) References Cited

U.S. PATENT DOCUMENTS

| | | | |
|---|---|---|---|
| 9,942,802 B2* | 4/2018 | Jung | H04W 24/10 |
| 9,992,711 B2* | 6/2018 | Xu | H04W 68/00 |
| 10,129,802 B2* | 11/2018 | Pelletier | H04W 24/08 |
| 2011/0317659 A1 | 12/2011 | Ramachandran et al. | |
| 2013/0028069 A1 | 1/2013 | Pelletier et al. | |
| 2013/0329583 A1* | 12/2013 | Vrzic | H04W 36/302 |
| | | | 370/252 |
| 2014/0080484 A1 | 3/2014 | Centonza | H04W 36/0055 |
| | | | 455/436 |
| 2015/0163041 A1 | 6/2015 | Kodali et al. | |
| 2015/0333896 A1 | 11/2015 | Damnjanovic | H04W 72/048 |
| | | | 370/277 |
| 2015/0358866 A1 | 12/2015 | Xu | H04W 36/38 |
| | | | 370/331 |
| 2015/0373528 A1* | 12/2015 | Iwai | H04W 4/70 |
| | | | 455/419 |
| 2016/0007237 A1 | 1/2016 | Jung | H04L 41/0816 |
| | | | 455/438 |
| 2016/0234819 A1 | 8/2016 | da Silva et al. | |
| 2018/0092118 A1 | 3/2018 | Kim | H04W 28/0278 |
| 2019/0364433 A1* | 11/2019 | Das | G06N 5/045 |
| 2019/0364575 A1 | 11/2019 | Zhang | H04W 48/08 |
| 2023/0189315 A1* | 6/2023 | Haustein | H04W 24/02 |
| | | | 370/252 |
| 2024/0022927 A1* | 1/2024 | Tong | H04W 4/40 |

FOREIGN PATENT DOCUMENTS

| | | |
|---|---|---|
| EP | 2 854 444 A1 | 4/2015 |
| JP | 2010532961 A | 10/2010 |
| KR | 1020140054117 A | 5/2014 |
| KR | 10-2015-0096499 A | 8/2015 |
| KR | 1020150106401 A | 9/2015 |
| KR | 10-2015-0122615 A | 11/2015 |
| RU | 2553663 C1 | 6/2015 |
| WO | 2012074878 A2 | 6/2012 |
| WO | 2014/109602 A1 | 7/2014 |
| WO | 2015/015300 A2 | 2/2015 |
| WO | 2015/067823 A1 | 5/2015 |
| WO | 2015/085273 A1 | 6/2015 |
| WO | 2015/146825 A1 | 10/2015 |
| WO | 2015/158370 A1 | 10/2015 |
| WO | 2015/171053 A1 | 11/2015 |

OTHER PUBLICATIONS

Ryuji Nakamura, 5GMF ga Tenbo suru '5G no Subete' (Musen Access Hen), Subete Wakaru 5G Daizen, Nov. 12, 2015, pp. 74-81 (10 pages).
3GPP TSG-RAN WG2 #84, Tdoc R2-134221, "L2 transport of SRBs and relation to RLF handling," Ericsson, Nov. 11-15, 2013, pp. 1-5, San Francisco, USA.
3GPP TSG RAN WG2 Meeting #84, R2-134053, "RLM considerations for dual connectivity," CATT, CATR, Nov. 11-15, 2013, pp. 1-4, San Francisco, USA.
3GPP TSG RAN meeting #70, RP-15244, "Draft Letter to ITU on final submission for IMT-2000 CDMA DS and IMT-2000 CDMA TDD toward Rev. 13 of Rec. ITU-R M. 1457," Dec. 7-10, 2015, 20 pages, Sitges, Spain.
International Search Report of PCT/JP2016/087143 dated Jan. 24, 2017.
Communication dated Mar. 18, 2019, from the Russian Federal Service for Intellectual Property in counterpart Application No. 2018123720/08.
Communication dated Jul. 22, 2019 from the Korean Intellectual Property Office in application No. 1020187019333.
Communication dated Jul. 31, 2019 from European Patent Office in counterpart EP Application No. 16883747.4.
Communication dated Jan. 28, 2020, issued by the Korean Intellectual Property Office in Korean Application No. 10-2018-7019333.
Telecom Italia, Orange, Telefonica, "Scope of 5G Study Item on RAN architecture", 3GPP TSG RAN Meeting #70, Dec. 7-10, 2015, RP-151994, total 4 pages.
NTT Docomo, Inc., "Demodulation test cases for Dual Connectivity", 3GPP TSG-RAN Working Group 4 (RAdio) Meeting #74bis, Apr. 20-24, 2015, R4-151484, pp. 1-3 (total 3 pages).
NTT Docomo, Inc., "5G Vision for 2020 and Beyond", 3GPP RAN workshop on 5G, Sep. 17-18, RWS-150051, total 23 pages.
Communication dated Feb. 13, 2020 from Russian Patent Office in RU Application No. 2019125195/08.
Communication dated Mar. 24, 2020 from Japanese Patent Office in JP Application No. 2019-090535.
Notification of Reasons for Refusal issued Mar. 4, 2019 in Japanese Patent Application No. 2017-560073.
Decision to Grant issued Jul. 16, 2019 in Japanese Patent Application No. 2017-560073.
3GPP TS 36.300 V12.8.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 2015-12, 254 pages total.
Notice of Grounds of Rejection dated May 19, 2020, from the Korean Intellectual Property Office in Application No. 10-2020-7011811.
Nokia Networks, Protocol architecture for WLAN-LTE aggregation, 3GPP TSG-RAN WG2 #89b R2-151071, Apr. 10, 2015.
Intel Corporation, View on 5G Radio Technology and Standardization, 3GPP RAN workshop on 5G RWS-150023, Sep. 3, 2015.
Communication dated Oct. 13, 2020, from Japanese Patent Office in JP Application No. 2019-145164.
Communication dated Dec. 8, 2020, from the Japanese Patent Office in application No. 2019-090535.
Chinese Office Action for CN Application No. 201680078384.6 mailed on Sep. 26, 2021 with English Translation.
Chinese Office Action for CN Application No. 201680078384.6 mailed on Jul. 12, 2022 with English Translation.

\* cited by examiner

METHODS AND APPARATUSES FOR TRANSMITTING CONTROL-PLANE MESSAGES IN CELLS USING DIFFERENT RADIO ACCESS TECHNOLOGIES

The present application is a Continuation application of Ser. No. 17/176,770 filed on Feb. 16, 2021, which is a Continuation application of Ser. No. 16/063,735 filed on Jun. 19, 2018, which issued as U.S. Pat. No. 10,952,099, which is a National Stage of International Application No. PCT/JP2016/087143 filed on Dec. 14, 2016, claiming priority based on Japanese Patent Application No. 2016-002879 filed on Jan. 8, 2016, the disclosure of which is incorporated herein in its entirety by reference.

TECHNICAL FIELD

The present disclosure relates to communication between a radio station and a radio terminal using a plurality of Radio Access Technologies (RATs).

BACKGROUND ART

The 3rd Generation Partnership Project (3GPP) is starting to work on the standardization for 5G, i.e., 3GPP Release 14, in 2016 to make 5G a commercial reality in 2020. 5G is expected to be realized by continuous enhancement/evolution of LTE and LTE-Advanced and an innovative development by an introduction of a new 5G air-interface (i.e., a new Radio Access Technology (RAT)). The new RAT (i.e., New 5G RAT) supports, for example, frequency bands higher than the frequency bands (e.g., 6 GHz or lower) supported by the LTE/LTE-Advanced and its enhancement/evolution. For example, the new RAT supports centimeter-wave bands (10 GHz or higher) and millimeter-wave bands (30 GHz or higher).

Higher frequency can provide higher-rate communication. However, because of its frequency properties, coverage of the higher frequency is more local. Therefore, high frequencies are used to boost capacity and data rates in specific areas, while wide-area coverage is provided by lower current frequencies. That is, in order to ensure the stability of New 5G RAT communication in high frequency bands, tight integration or interworking between low and high frequencies (i.e., tight integration or interworking between LTE/LTE-Advanced and New 5G RAT) is required. A 5G supporting radio terminal (i.e., 5G User Equipment (UE)) is connected to both of a low frequency band cell and a high frequency band cell (i.e., a LTE/LTE-Advanced cell and a new 5G cell) by using Carrier Aggregation (CA) or Dual Connectivity (DC), or a modified technique thereof.

Non-Patent Literature 1 discloses user-plane and control-plane architectures to use both the LTE air interface (i.e., LTE RAT) and the new 5G air interface (i.e., New 5G RAT). In some implementations, a common Radio Resource Control (RRC) layer and a common Packet Data Convergence Protocol (PDCP) layer (or sublayer) are used. The common PDCP layer is connected to LTE lower layers and New 5G lower layers, and provides an upper layer with a transfer service of user plane data and control plane data through the LTE lower layers and the New 5G lower layers. The LTE lower layers include a Radio Link Control (RLC) layer, a Medium Access Control (MAC) layer, and a physical layer for the LTE-RAT. In a similar way, the New 5G lower layers include an RLC layer, a MAC layer, and a physical layer for the New 5G RAT.

Non-Patent Literature 1 further discloses transmitting the same control-plane message simultaneously on both an LTE cell and a New 5G cell (i.e., Control Plane Diversity) and switching the path of a control-plane connection from an LTE cell to a New 5G cell and vice versa (i.e., Fast Control Plane Switching) based on the premise that the common PDCP layer and the common RRC layer are arranged in the LTE base station. The use of the common PDCP and the common RRC layer allows the UE to be connected to one control point (i.e., the common RRC layer) via one of a plurality of air interfaces.

The term "LTE" used in this specification includes enhancements of LTE and LTE-Advanced for 5G to provide tight interworking with the New 5G RAT, unless otherwise indicated. Such enhancements of LTE and LTE-Advanced are also referred to as LTE-Advanced Pro, LTE+, or enhanced LTE (eLTE). Further, the term "5G" or "New 5G" in this specification is used, for the sake of convenience, to indicate an air-interface (RAT) that is newly introduced for the fifth generation (5G) mobile communication systems, and nodes, cells, protocol layers, etc. related to this air-interface. The names of the newly introduced air interface (RAT), and nodes, cells, and protocol layers related thereto will be determined in the future as the standardization work progresses. For example, the LTE RAT may be referred to as Primary RAT (P-RAT or pRAT) or Master RAT. Meanwhile, the New 5G RAT may be referred to as Secondary RAT (S-RAT or sRAT).

CITATION LIST

Non Patent Literature

[Non-Patent Literature 1] Da Silva, I.; Mildh, G.; Rune, J.; Wallentin, P.; Vikberg, J.; Schliwa-Bertling, P.; Rui Fan, "Tight Integration of New 5G Air Interface and LTE to Fulfill 5G Requirements," in Vehicular Technology Conference (VTC Spring), 2015 IEEE 81st, pp. 1-5, 11-14 May 2015

SUMMARY OF INVENTION

Technical Problem

The inventors have studied the 5G radio architecture that provides tight interworking of the LTE RAT and the New 5G RAT and found some problems. For example, Non-Patent Literature 1 does not take into account a control plane specific to New 5G cells. In some implementations, control plane (CP) messages specific to New 5G cells (e.g., allocation of a temporary UE ID, configuration of lower layers, signalling for service quality management, and measurement reporting) may be required. In some implementations, a signalling connection specific to 5G cells (e.g., an RRC connection and a Signaling Radio Bearer (SRB)) may be required. It may be efficient for the New-5G-cell-specific control plane (CP) messages and the 5G-cell-specific signalling connections to be transmitted via New 5G cells, not via LTE cells. For example, one of the important requirements for 5G is low latency, and accordingly it can be expected that 5G UEs will be able to perform communication on New 5G cells with latency lower than that of communication on LTE cells.

Accordingly, one of the objects to be attained by embodiments disclosed herein is to provide an apparatus, a method, and a program that contribute to efficient transmission of control-plane messages through a cell of the subordinate RAT in a radio architecture that provides interworking of two different RATs. It should be noted that this object is merely one of the objects to be attained by the embodiments disclosed herein. Other objects or problems and novel features will be made apparent from the following description and the accompanying drawings.

Solution to Problem

In a first aspect, a radio station system includes one or more radio stations. The one or more radio stations are configured to simultaneously provide, for one radio terminal, at least one first cell in accordance with a first radio access technology and at least one second cell in accordance with a second radio access technology and used in addition and subordinate to the at least one first cell. The one or more radio stations are configured to transmit or receive a control-plane message to or from the radio terminal on the at least one second cell when a predetermined condition is satisfied. The control-plane message includes a non-access stratum (NAS) message or a radio resource control (RRC) message or both. The predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

In a second aspect, a method in a radio station system, including one or more radio stations, includes:
  (a) simultaneously providing, for one radio terminal, at least one first cell in accordance with a first radio access technology and at least one second cell in accordance with a second radio access technology and used in addition and subordinate to the at least one first cell; and
  (b) transmitting or receiving a control-plane message to or from the radio terminal on the at least one second cell when a predetermined condition is satisfied. The control-plane message includes a non-access stratum (NAS) message or a radio resource control (RRC) message or both. The predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

In a third aspect, a radio terminal includes a memory and at least one processor coupled to the memory. The at least one processor is configured to communicate with a radio station system including one or more radio stations simultaneously on at least one first cell in accordance with a first radio access technology and at least one second cell in accordance with a second radio access technology and used in addition and subordinate to the at least one first cell. The at least one processor is configured to transmit or receive a control-plane message to or from the radio station system on the at least one second cell when a predetermined condition is satisfied. The control-plane message includes a non-access stratum (NAS) message or a radio resource control (RRC) message or both. The predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

In a fourth aspect, a method in a radio terminal includes:
  (a) communicating with a radio station system including one or more radio stations simultaneously on at least one first cell in accordance with a first radio access technology and at least one second cell in accordance with a second radio access technology and used in addition and subordinate to the at least one first cell; and
  (b) transmitting or receiving a control-plane message to or from the radio station system on the at least one second cell when a predetermined condition is satisfied. The control-plane message includes a non-access stratum (NAS) message or a radio resource control (RRC) message or both. The predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

In a fifth aspect, a program includes instructions (software codes) that, when loaded into a computer, cause the computer to perform the method according to the aforementioned second or fourth aspect.

Advantageous Effects of Invention

According to the above-described aspects, it is possible to provide an apparatus, a method, and a program that contribute to efficient transmission of control-plane messages via a cell of the subordinate RAT in a radio architecture that provides interworking of two different RATs.

DESCRIPTION OF EMBODIMENTS

Specific embodiments are described hereinafter in detail with reference to the drawings. The same or corresponding elements are denoted by the same reference symbols throughout the drawings, and repetitive descriptions are avoided for clarity.

Each of embodiments described below may be used individually, or two or more of the embodiments may be appropriately combined with one another. These embodiments include novel features different from one another. Accordingly, these embodiments contribute to achieving objects or solving problems different from one another and contribute to obtaining advantages different from one another.

The following descriptions on the embodiments mainly focus on specific examples with regard to the 5G radio architecture that provides tight interworking of the LTE RAT and the New 5G RAT. However, these embodiments are not limited to being applied to the 5G radio architecture and may also be applied to other radio architectures that provide tight interworking of two different RATs.

First Embodiment

Figure 1:
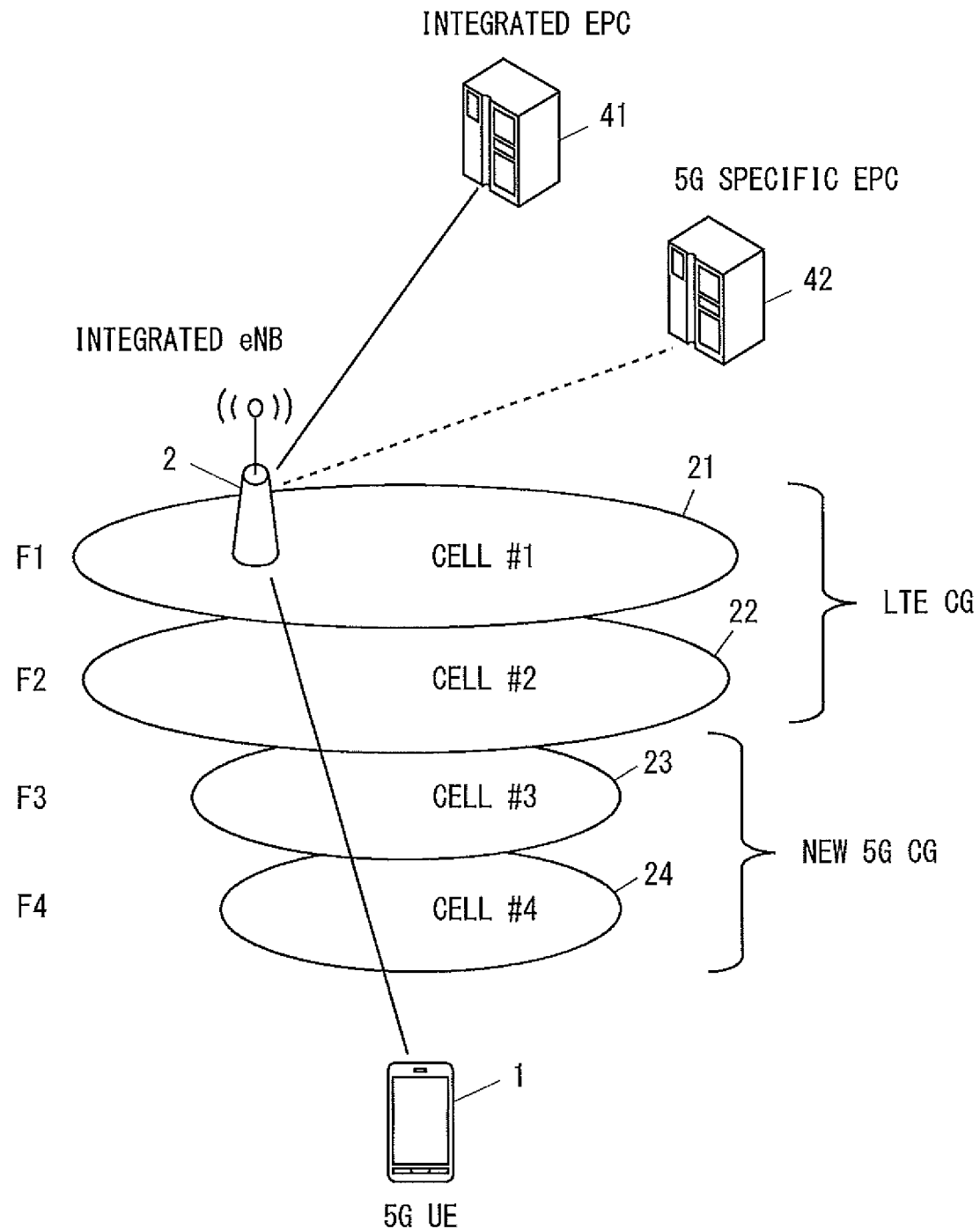
FIG. 1 is a diagram showing a configuration example of a radio communication network according to several embodiments.

FIG. 1 shows a configuration example of a radio communication network according to several embodiments including this embodiment. In the example shown in FIG. 1, the radio communication network includes a radio terminal (UE) 1 and an integrated base station (i.e., integrated eNB) 2. The UE 1 is a 5G UE and connects to both one or more LTE cells (e.g., cells 21 and 22) and one or more New 5G cells (e.g., cells 23 and 24) using CA, DC, or an enhancement thereof. In the following description, one or more LTE cells are referred to as an LTE cell group (CG) and one or more New 5G cells used by the 5G UE 1 are referred to as a New 5G CG. Each of the cells in the LTE CG and New 5G CG has been configured for the 5G UE 1 by the integrated eNB 2 and has been activated by the integrated eNB 2. In some implementations, frequency bands (e.g., F1 and F2) of the LTE CG (e.g., the cells 21 and 22) are lower frequency bands (e.g., lower than 6 GHZ) and frequency bands (e.g., F3 and F4) of the New 5G CG (e.g., the cells 23 and 24) are higher frequency bands (e.g., higher than 6 GHz).

The integrated eNB 2 supports 5G and provides a plurality of cells that use a plurality of component carriers (CCs) having different frequencies and using different RATs. In the example shown in FIG. 1, the integrated eNB 2 provides LTE cells 21 and 22 and New 5G cells 23 and 24. The integrated eNB 2 communicates with the 5G UE 1 via both the LTE CG (e.g., the cells 21 and 22) and the New 5G CG (e.g., the cells 23 and 24) using CA, DC, or an enhancement thereof. Further, the integrated eNB 2 is connected to a core network, that is, an integrated Evolved Packet Core (i.e., integrated EPC) 41. The integrated EPC 41 provides LTE core network functions and 5G new core network functions. In some implementations, the integrated eNB 2 may be connected to a 5G specific core network (i.e., 5G specific EPC 42).

Figure 2:
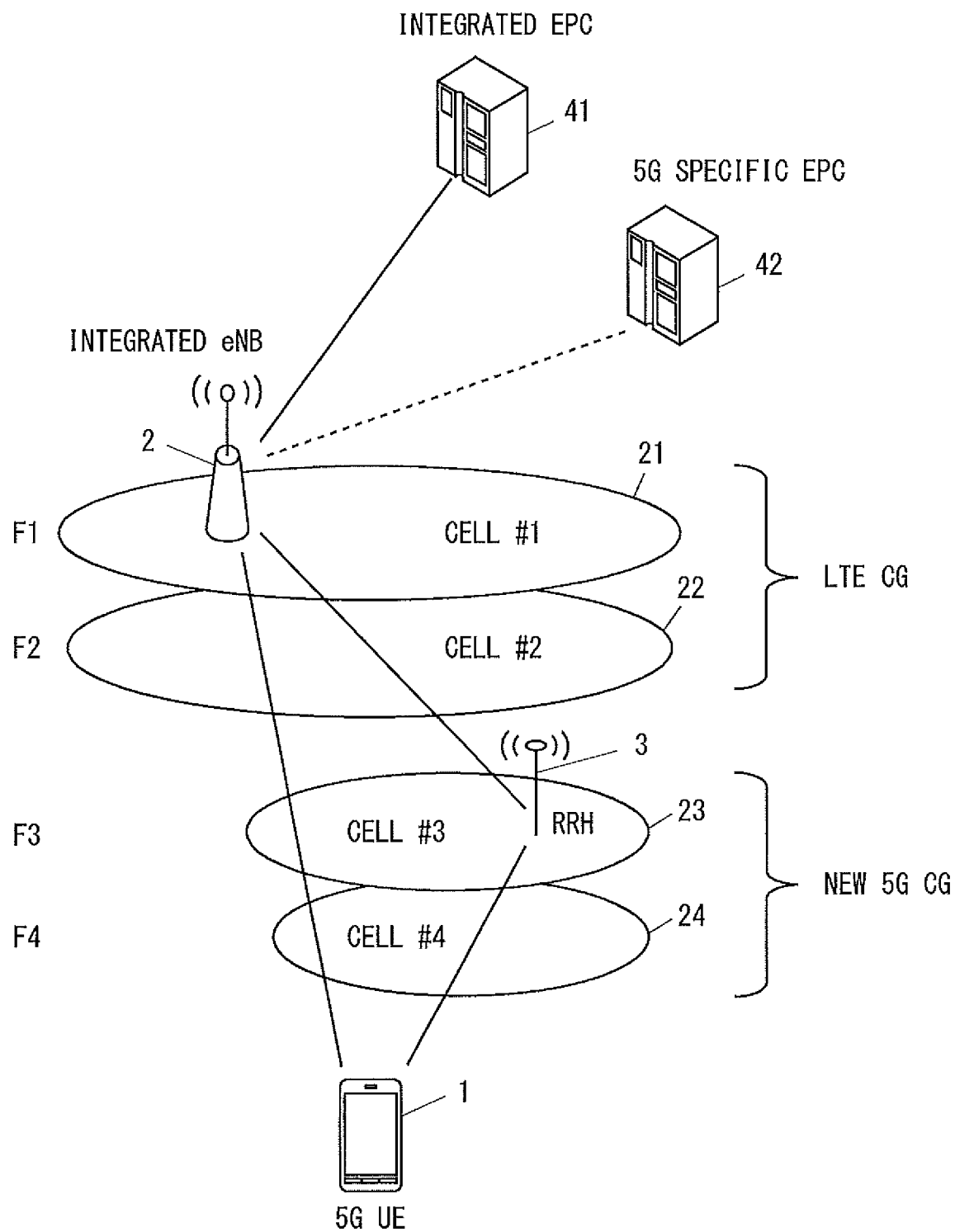
FIG. 2 is a diagram showing a configuration example of the radio communication network according to the several embodiments.

As shown in FIG. 2, a remote radio unit 3 may be used to provide at least one of the cells of the integrated eNB 2 (e.g., New 5G cells 23 and 24). In the configuration shown in FIG. 2, the integrated eNB 2 performs digital signal processing regarding uplink and downlink signals, and meanwhile the radio unit 3 performs analog signal processing of the physical layer. For example, the integrated eNB 2 and the radio unit 3 are connected to each other by an optical fiber, and a digital baseband signal is transferred through this optical fiber in accordance with the Common Public Radio Interface (CPRI) standard. The configuration shown in FIG. 2 is referred to as a Cloud Radio Access Network (C-RAN). The radio unit 3 is referred to as a Remote Radio Head (RRH) or a Remote Radio Equipment (RRE). The integrated eNB 2 that performs baseband digital signal processing is referred to as a Baseband Unit (BBU). Further, information about any one of the layers 1, 2, and 3 (or a signal containing this information) may be transferred using a fronthaul (interface) that is to be standardized by, for example, 3GPP or Small Cell Forum. For example, a form in which the fronthaul connects between the L1 and the L2 or between Sub-layers in the L2 is also referred to as L2 C-RAN. In this case, the integrated eNB 2 and the RRH 3 shown in FIG. 2 are also referred to as a Digital Unit (DU) and a Radio Unit (RU), respectively.

In the configuration examples shown in FIGS. 1 and 2, the LTE radio protocol and the New 5G radio protocol are implemented in one node (i.e., the integrated eNB 2). Accordingly, the configuration examples shown in FIGS. 1 and 2 are referred to as co-located deployments or co-located RAN. In the case of the L2 C-RAN configuration, a part of the New 5G radio protocol may be deployed in the RU. However, in another configuration example, non co-located deployments or non co-located RAN may be employed. In the Non co-located deployments, the LTE radio protocol and the New 5G radio protocol are provided by two nodes (eNBs) different from each other. These two nodes are installed, for example, at two different sites geographically spaced apart from each other.

Figure 3:
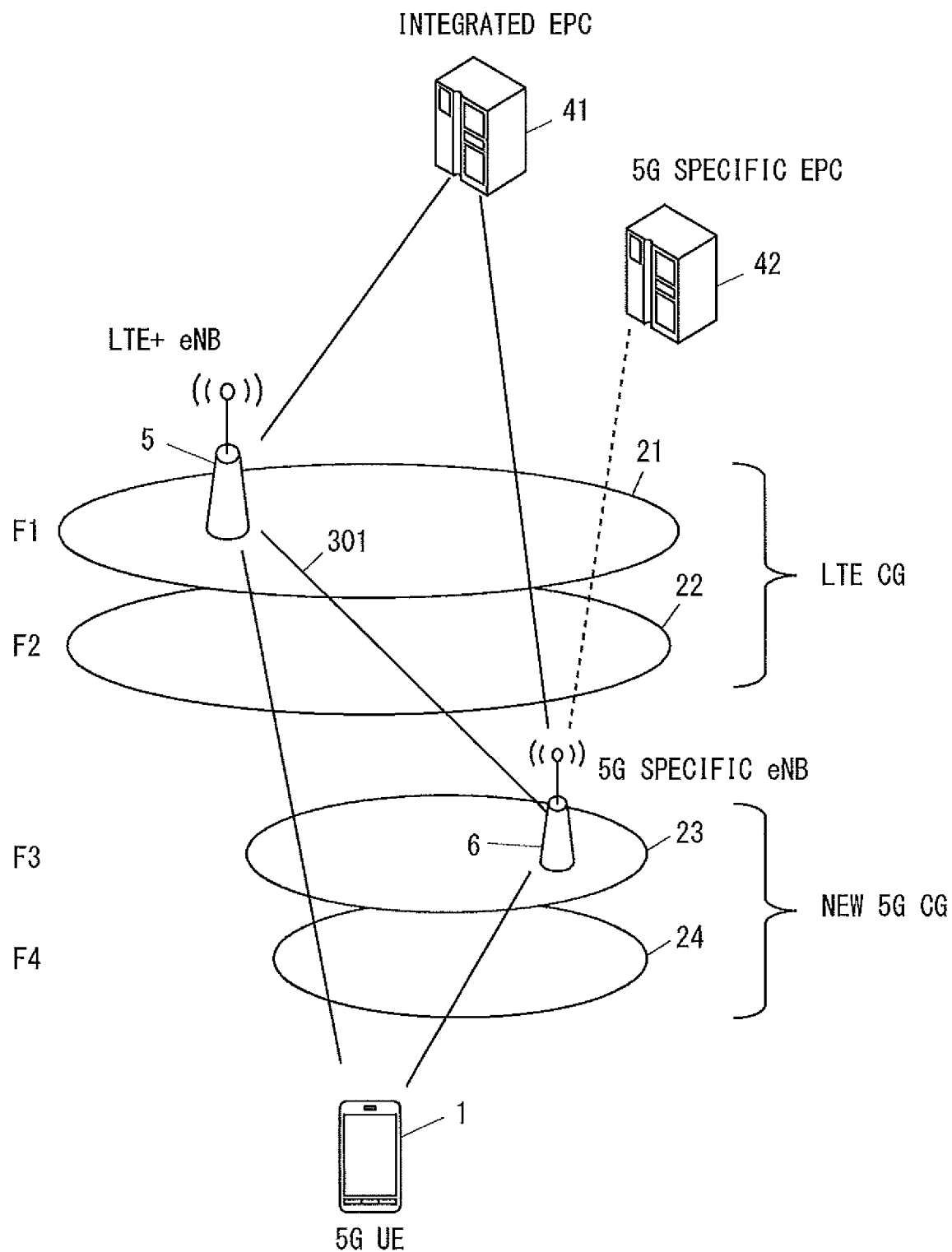
FIG. 3 is a diagram showing another configuration example of the radio communication network according to the several embodiments.

FIG. 3 shows an example of the non co-located deployments of the radio communication network according to several embodiments including this embodiment. In the example shown in FIG. 3, the radio communication network includes a 5G UE 1, an LTE+eNB 5, and a 5G specific eNB 6. The LTE+eNB 5 provides an LTE CG (e.g., the cells 21 and 22) and the 5G specific eNB 6 provides a New 5G CG (e.g., the cells 23 and 24). The LTE+eNB 5 is connected to the 5G specific eNB 6 by a communication line, such as an optical fiber link or a point-to-point radio link, and communicates with the 5G specific eNB 6 on an inter-base-station interface 301 (e.g., enhanced X2 interface). The LTE+eNB 5 and the 5G specific eNB 6 interwork with each other to enable the 5G UE 1 to connect to both the LTE CG and the 5G CG using CA, DC, or an enhancement thereof.

Figure 4:
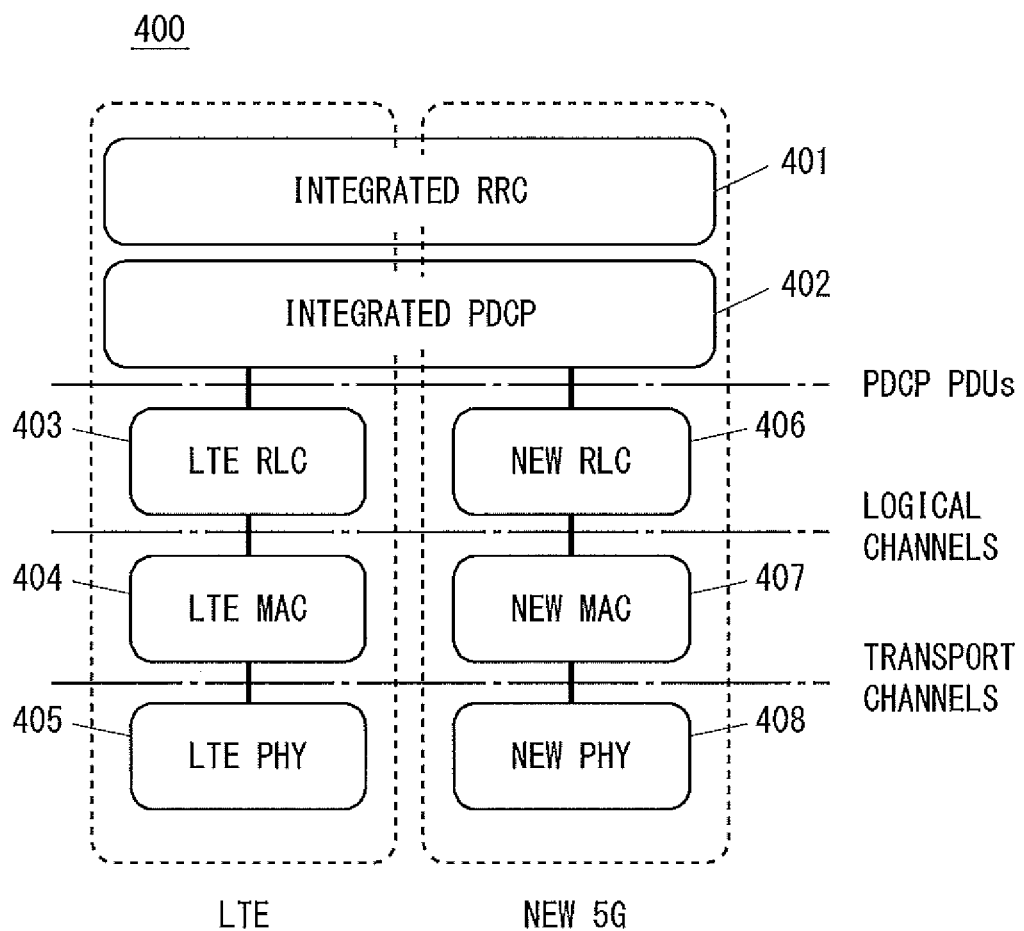
FIG. 4 is a diagram showing an example of a radio protocol stack according to the several embodiments.

FIG. 4 shows one example of the radio protocol stack supported by the 5G UE 1 and the integrated eNB 2. A radio protocol stack 400 shown in FIG. 4 includes a unified (or integrated) RRC layer 401 and a unified (or integrated) PDCP layer (or sublayer) 402. The integrated RRC layer 401 and the integrated PDCP layer 402 may also be referred to as a common RRC layer and a common PDCP layer, respectively. The radio protocol stack 400 further includes LTE lower layers and New 5G lower layers. The LTE lower layers include an LTE RLC layer 403, an LTE MAC layer 404, and an LTE PHY layer 405. The New 5G lower layers include a New RLC layer 406, a New MAC layer 407, and a New PHY layer 408. In the case of using the integrated eNB 2, some of the functions of the LTE PHY layer 405 (e.g., analog signal processing) may be provided by an RRH for LTE. In a similar way, some of the functions of the New PHY layer 408 (e.g., analog signal processing) may be provided by an RRH for New 5G. Further, in the case of using the above-described L2 C-RAN configuration, some of the functions of the New PHY layer, the New MAC layer, or the New RLC layer (and the functions of layers lower than it) may be provided by an RU for New 5G.

The integrated RRC layer 401 provides control-plane functions in the LTE RAT and the New 5G RAT. The main services and functions provided by the integrated RRC layer 401 include the following:

Transmission of system information for non-access stratum (NAS) and access stratum (AS);
Paging;
Establishment, maintenance, and release of RRC connections;
Security functions including key management;
Configuration, maintenance, and release of radio bearers;
Configuration of lower layer protocols (i.e., PDCP, RLC, MAC, and PHY);
QoS management;
UE measurement report and configuration thereof; and
Transfer of NAS messages between a UE and a core network.

The integrated RRC layer 401 communicates with the integrated PDCP layer 402 to perform management of radio bearers, control of ciphering/deciphering of data of the user plane (i.e., data radio bearers), control of ciphering/deciphering of data (i.e., RRC PDUs) of the control plane (i.e., signalling radio bearers), and control of integrity protection of data (i.e., RRC PDUs) of the control plane (i.e., signalling radio bearers). Further, the integrated RRC layer 401 controls the LTE RLC layer 403, the LTE MAC layer 404, and the LTE PHY layer 405, and also controls the New RLC layer 406, the New MAC layer 407, and the New PHY layer 408.

The integrated PDCP layer 402 provides an upper layer with transfer services of data of data radio bearers and signalling radio bearers. The integrated PDCP layer 402 receives services from the LTE RLC layer 403 and the New RLC layer 406. That is, the integrated PDCP layer 402 is provided with a transfer service of PDCP PDUs through the LTE RAT by the LTE RLC layer 403 and is provided with a transfer service of PDCP PDUs through the New 5G RAT by the New RLC layer 406.

Figure 5:
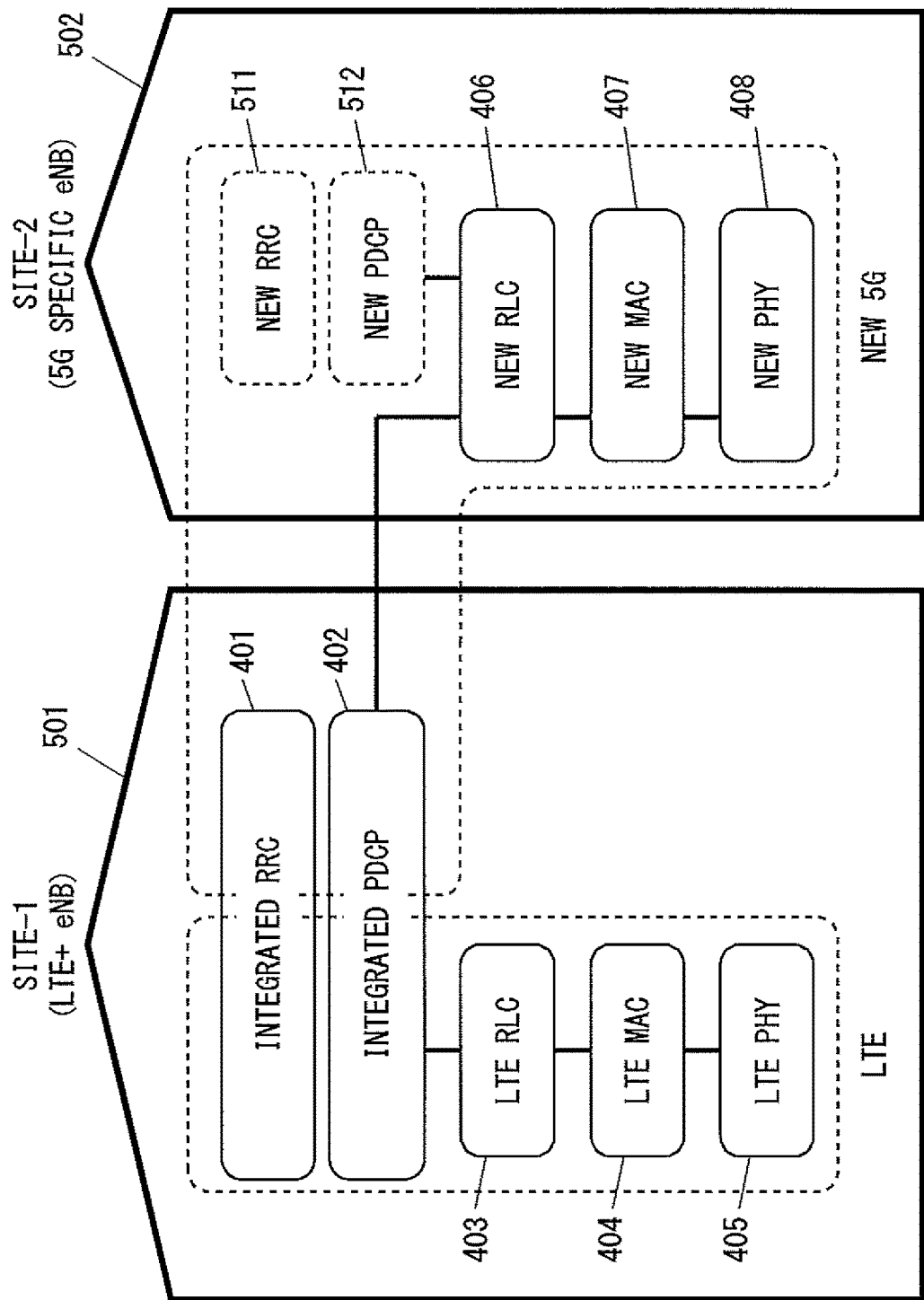
FIG. 5 is a diagram showing an example of the radio protocol stack according to the several embodiments.

It should be noted that the radio protocol stack 400, which uses the integrated PDCP layer 402, shown in FIG. 4 can be applied not only to the co-located deployments (e.g., FIGS. 1 and 2) but also to the non co-located deployments (e.g., FIG. 3). That is, as shown in FIG. 5, in the non co-located deployments, the LTE+eNB 5 is arranged in a site 501 and provides the integrated RRC layer 401, the integrated PDCP layer 402, the LTE RLC layer 403, the LTE MAC layer 404, and the LTE PHY layer 405. In contrast, the 5G specific eNB 6 is arranged in another site 502 and provides the New RLC layer 406, the New MAC layer 407, and the New PHY layer 408.

In some implementations, the 5G specific eNB 6 used in the non co-located deployments may include a New RRC layer 511 and a New PDCP layer 512. Further, the 5G specific eNB 6 may include a control interface or connection (e.g., an S1-MME interface or an S1-U interface) with a core network (e.g., the integrated EPC 41 or the 5G specific EPC 42) for the 5G UE 1. In some implementations, the New RRC layer 511 may configure the lower layers 406-408 of the New 5G CG (e.g., New 5G cells 23 and 24) and transmit system information (i.e., Master Information Block (MIB) or System Information Blocks (SIBs), or both) via the New 5G CG. The New RRC layer 511 may configure a signalling radio bearer with the 5G UE 1, also configure the lower layers 406-408 of the New 5G CG (e.g., the New 5G cells 23 and 24) and the New PDCP layer 512, and then transmit or receive RRC messages to or from the 5G UE 1 through the New 5G CG. The New RRC layer 511 may transfer NAS messages between the core network (e.g., the integrated EPC 41 or the 5G specific EPC 42) and the 5G UE 1. The New PDCP layer 512 provides the New RRC layer 511 with a transfer service of RRC messages via the New 5G lower layers 406-408.

The New RRC layer 511 may depend on the integrated RRC layer 401 (i.e., have a dependency relationship) or may perform control similar to that performed by the integrated RRC layer 401 (i.e., have a similar function). In the former case (i.e., dependency relationship), the 5G specific eNB 6 (or the New RRC layer 511 thereof) may generate RRC configuration information with respect to a New 5G cell(s) (i.e., New 5G CG) in response to an instruction or a request from the LTE+eNB 5 (or the integrated RRC layer 401 thereof). The 5G specific eNB 6 (or the New RRC layer 511 thereof) may transmit this RRC configuration information to the LTE+eNB 5 (or the integrated RRC layer 401 thereof) and the LTE+eNB 5 may transmit an RRC message containing this RRC configuration information (e.g., an RRC Connection Reconfiguration message) to the 5G UE 1 on an LTE cell (i.e., LTE CG). Alternatively, the 5G specific eNB 6 (or the New RRC layer 511 thereof) may transmit an RRC message containing this RRC configuration information to the 5G UE 1 on a New 5G cell.

The 5G UE 1 may support the protocol stack shown in FIG. 4 or support another protocol stack to communicate with the radio network shown in FIG. 5. For example, the 5G UE 1 may have an RRC layer (i.e., a master RRC layer or a primary RRC layer) corresponding to the integrated RRC layer 401 of the LTE+eNB 5 and an auxiliary RRC layer (i.e., a sub RRC layer or a secondary RRC layer) corresponding to the New RRC layer 511 of the 5G specific eNB 6. For example, the sub RRC layer may perform one or both of transmission and reception (or one or both of generation and restoration) of a part of the RRC configuration information controlled by the master RRC layer. The 5G UE 1 may receive both the RRC configuration information regarding a LTE cell(s) (i.e., LTE CG) and the RRC configuration information regarding a New 5G cell(s) (i.e., New 5G CG) through an LTE cell or through a New 5G cell. Alternatively, the 5G UE 1 may receive the RRC configuration information regarding a LTE cell(s) (i.e., LTE CG) through an LTE cell and meanwhile receive the RRC configuration information regarding a New 5G cell(s) (i.e., New 5G CG) through a New 5G cell.

The radio protocol stack shown in FIG. 4 is merely one example and, alternatively, the 5G UE 1 and the integrated eNB 2 may support another protocol stack. For example, in FIG. 4, the integrated PDCP layer 402 integrates (or allows interworking of) the LTE lower layers and the New 5G lower layers. Alternatively, an integrated MAC layer may be used to integrate (or allow interworking of) the LTE PHY layer 405 and the New PHY layer 408.

Figure 6:
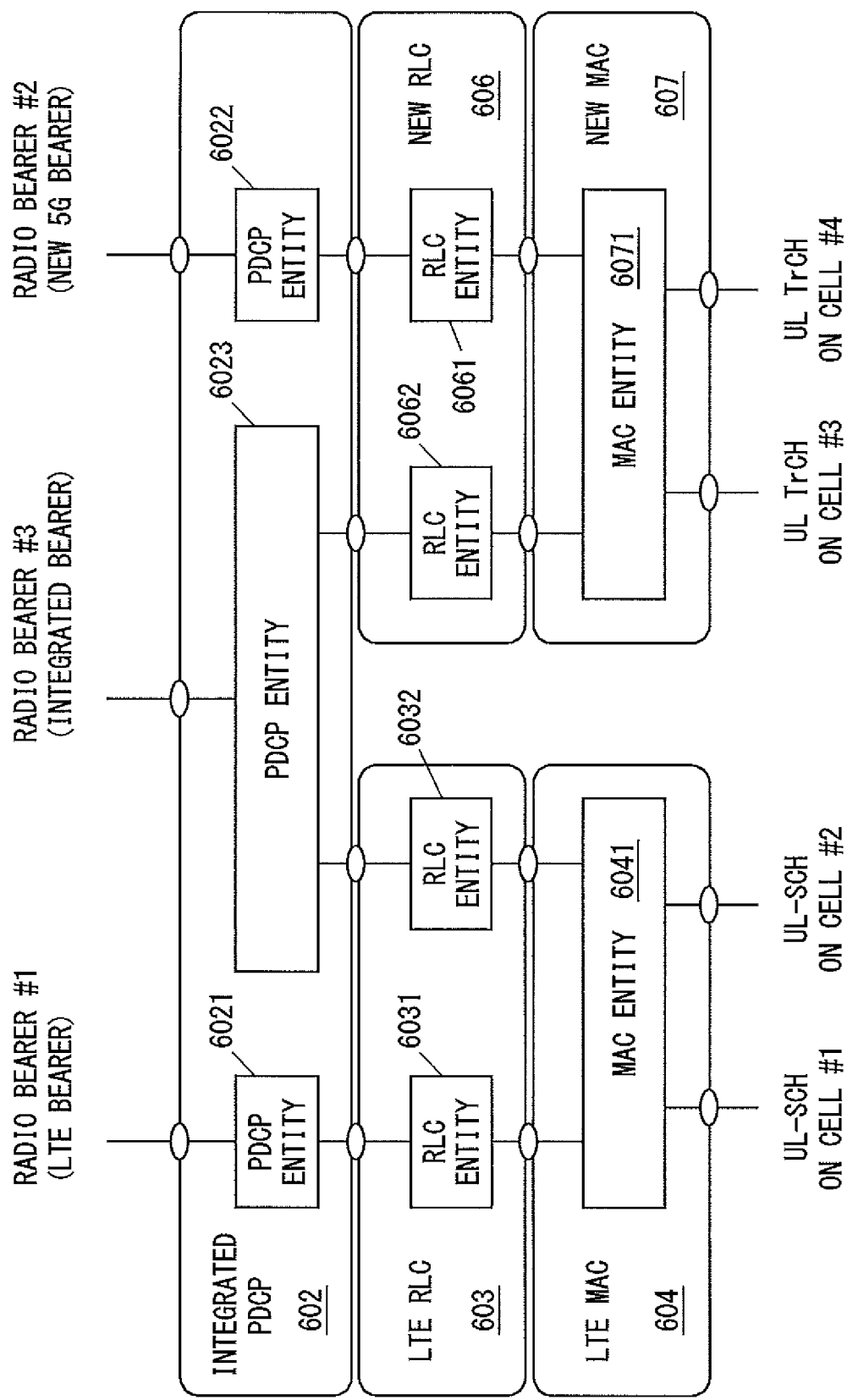
FIG. 6 is a diagram showing an example of a layer-2 structure according to the several embodiments.

FIG. 6 shows one example of the layer-2 structure for uplink according to the several embodiments. The layer-2 structure for downlink is similar to that shown in FIG. 6 except for some points, such as the terms used to describe the transport channels. An integrated PDCP layer 602, an LTE RLC layer 603, an LTE MAC layer 604, a New RLC layer 606, and a New MAC layer 607 shown in FIG. 6 respectively correspond to the integrated PDCP layer 402, the LTE RLC layer 403, the LTE MAC layer 404, the New RLC layer 406, and the New MAC layer 407 shown in FIGS. 4 and 5.

The integrated PDCP layer 602 includes one or more PDCP entities. Each PDCP entity transports data of one radio bearer. Each PDCP entity is associated with either the user plane or the control plane depending on which radio bearer (i.e., a data radio bearer (DRB) or a signalling radio bearer (SRB)) it transports data from. In the example shown in FIG. 6, the integrated PDCP layer 602 includes three PDCP entities 6021, 6022, and 6023 that correspond to three radio bearers #1, #2, and #3, respectively. Each of the radio bearers #1, #2, and #3 may be an SRB or a DRB.

The data of the radio bearer #1 is transmitted from the 5G UE 1 to the integrated eNB 2 (or the LTE+eNB 5) via the LTE RAT on the LTE CG (e.g., the LTE cells 21 and 22). Accordingly, the radio bearer #1 may be hereinafter referred to as an LTE bearer. The radio bearer #1 is similar to an MCG bearer in LTE Release 12 DC.

The data of the radio bearer #2 is transmitted from the 5G UE 1 to the integrated eNB 2 (or the 5G specific eNB 6) via the New 5G RAT on the New 5G CG (e.g., the New 5G cells 23 and 24).

Accordingly, the radio bearer #2 may be hereinafter referred to as a New 5G bearer. When the data is transmitted on the New 5G CG managed by the 5G specific eNB 6, the radio bearer #2 is similar to an SCG bearer in LTE Release 12 DC. Alternatively, when the data is transmitted on the New 5G CG managed by the integrated eNB 2, the radio bearer #2 may be similar to a bearer on the SCG side of a split bearer in LTE Release 12 DC.

The radio bearer #3 is similar to a split bearer in LTE Release 12 DC. That is, the radio bearer #3 is associated with both of one logical channel of the LTE RAT and one logical channel of the New 5G RAT to use both the resources of the LTE CG and the resources of the New 5G CG. In the case of the user data, the logical channel of the LTE RAT is a Dedicated Traffic Channel (DTCH). The logical channel of the New 5G RAT is a 5G logical channel for the user data that corresponds to the DTCH. The radio bearer #3 may be hereinafter referred to as a split bearer or a unified bearer (an integrated bearer).

In the case of uplink transmission by the 5G UE 1, the PDCP entity 6021 generates PDCP PDUs from data of the radio bearer #1 (i.e., LTE bearer) and sends these PDCP PDUs to an LTE RLC entity 6031. In the case of uplink reception by the integrated eNB 2 (or the LTE+eNB 5), the PDCP entity 6021 receives RLC SDUs (i.e., PDCP PDUs) from the LTE RLC entity 6031 and sends data of the radio bearer #1 to the upper layer.

In the case of uplink transmission by the 5G UE 1, the PDCP entity 6022 generates PDCP PDUs from data of the radio bearer #2 (i.e., New 5G bearer) and sends these PDCP PDUs to a New RLC entity 6061. In the case of uplink reception by the integrated eNB 2 (or the 5G specific eNB 6), the PDCP entity 6022 receives RLC SDUs (i.e., PDCP PDUs) from the New RLC entity 6061 and sends data of the radio bearer #2 to the upper layer.

In the case of uplink transmission by the 5G UE 1, the PDCP entity 6023 generates PDCP PDUs from data of the radio bearer #3 (i.e., integrated bearer) and routes these PDCP PDUs to an LTE RLC entity 6032 or a New RLC entity 6062. In the case of uplink reception by the integrated eNB 2 (or the LTE+eNB 5 and the 5G specific eNB 6), the PDCP entity 6023 reorders PDCP PDUs (i.e., RLC SDUs) received from the LTE RLC entity 6032 and the New RLC entity 6062 and sends data of the radio bearer #3 to the upper layer.

Each RLC entity in the LTE RLC layer 603 and the New RLC layer 606 is configured, by the integrated RRC entity (i.e., the RRC entity 401 shown in FIG. 4), with RLC Acknowledged Mode (RLC AM) data transfer or RLC Unacknowledged Mode (RLC UM) data transfer, and then provides a transfer service of PDCP PDUs. In the case of uplink transmission by the 5G UE 1, each RLC entity in the LTE RLC layer 603 generates RLC PDUs (i.e., data of one logical channel) from PDCP PDUs (i.e., RLC SDUs) and sends these RLC PDUs to a MAC entity 6041 in the LTE MAC layer 604. In a similar way, each RLC entity in the New RLC layer 606 generates RLC PDUs (i.e., data of one logical channel) from PDCP PDUs (i.e., RLC SDUs) and sends them to a MAC entity 6071 in the New MAC layer 607.

In the example shown in FIG. 6, one MAC entity 6041 is used for two LTE cells (i.e., LTE CG) configured for one 5G UE 1. In the case of uplink transmission by the 5G UE 1, the MAC entity 6041 multiplexes RLC PDUs (i.e., MAC SDUs), which belong to the two logical channels from the two RLC entities 6031 and 6032, into two transport blocks per Transmission Time Interval (TTI). The two transport blocks per TTI are sent to the LTE physical layer 405 through two UL transport channels (i.e., UL-SCHs) corresponding to the two LTE cells 21 and 22.

In a similar way, one MAC entity 6071 is used for two New 5G cells (i.e., New 5G CG) configured for one 5G UE 1. In the case of uplink transmission by the 5G UE 1, the MAC entity 6071 multiplexes RLC PDUs (i.e., MAC SDUs), which belong to two logical channels from two RLC entities 6071 and 6072, into two transport blocks per Transmission Time Interval (TTI). The two transport blocks per TTI are sent to the physical layer 408 for New 5G through two UL transport channels (i.e., UL TrCHs) corresponding to the two New 5G cells 23 and 24.

As described above, the layer-2 structure for downlink is similar to that shown in FIG. 6 except for some points, such as the terms used to describe the transport channels. For example, in the case of downlink reception by the 5G UE 1, the PDCP entity 6023 of the 5G UE 1 reorders PDCP PDUs (i.e., RLC SDUs) received from the LTE RLC entity 6032 and from the New RLC entity 6062, and then sends data of the radio bearer #3 (i.e., integrated bearer) to the upper layer.

In the following, an operation of transmitting a control-plane (CP) message performed by the 5G UE 1 and the integrated eNB 2 (or the LTE+eNB 5 and the 5G specific eNB 6) according to this embodiment will be explained. The 5G UE 1 and the base station system are configured to transmit CP messages (i.e., RRC signalling) on a New 5G cell after completion of configuration and activation of this New 5G cell (i.e., after the New 5G cell becomes available for the 5G UE 1). The 5G UE 1 and the base station system may switch the cell, to be used to transmit CP messages, from the LTE cell to the New 5G cell. Further or alternatively, the 5G UE 1 and the base station system may adaptively change the cell, to be used to transmit CP messages, between the LTE cell and the New 5G cell. The CP messages include NAS messages or RRC messages or both. The base station system is the integrated eNB 2, or a combination of the LTE+eNB 5 and the 5G specific eNB 6.

To be more specific, the 5G UE 1 is configured to transmit or receive CP messages to or from the base station system on any New 5G cell within the New 5G CG when a predetermined condition is satisfied. In a similar way, the base station system is configured to transmit or receive CP message to or from the 5G UE 1 on any New 5G cell within the New 5G CG when a predetermined condition is satisfied. The predetermined condition, which is used to determine which one of the LTE CG and the New 5G CG is used to transmit a CP message, relates to at least one of the following:

(a) the content or type of the CP message
(b) the type of the signalling radio bearer used to transmit the CP message,
(c) the transmission cause of the CP message; and
(d) the type of the core network associated with the NAS message.

The above condition (a) may be that the content or type of the CP message is (or is not) a specific content or type. The specific content or type may be at least one of: a request for terminal measurement regarding the New 5G cell; a report on a result of the measurement regarding the New 5G cell; a request for terminal (holding) information held by the terminal; a report on the terminal information; security configuration information about the access stratum (AS) of the New 5G cell; a request for AS-security activation; a response to the request for AS-security activation; configuration information specific to the New 5G RAT; and control information that will be newly defined for the New 5G cell by the 3GPP.

The above condition (b) may be that the type of the signalling radio bearer used to transmit the CP message is (or is not) a specific type. For example, the specific signalling-radio-bearer type may be a type corresponding to SRB0, SRB1, or SRB2 in LTE specified in advance, or may be a type corresponding to a new signalling radio bearer (e.g., SRBx).

The above condition (c) may be that the transmission cause of the CP message is (or is not) a specific transmission cause. For example, the specific transmission cause may be at least one of: degradation of a radio quality of the New 5G cell; a failure of a radio link establishment in the LTE cell or the New 5G cell; a request for re-establishment of the radio link after the failure of the radio link establishment; and a response to the request for re-establishment of the radio link.

The above condition (d) may be that the type of the core network used for the transmission of the NAS message is (or is not) a specific core-network type. For example, the specific core-network type may be a type corresponding to a core network that will be newly introduced for the New 5G RAT or may be a type corresponding to a core network that is previously designated for use for a specific service or function.

In a first implementation, the 5G UE 1 may determine which one of the New 5G CG and the LTE CG is to be used to transmit an RRC message depending on whether this RRC message includes a reporting message from the 5G UE 1 indicating a measurement result of one or more New 5G cells within the New 5G CG (i.e., Measurement report message). That is, when an RRC message includes a report from the 5G UE 1 on a measurement result of one or more New 5G cells, the 5G UE 1 may transmit this RRC message on any cell within the New 5G CG. The base station system may receive this RRC message on any cell within the New 5G CG. In contrast, when an RRC message includes a report from the 5G UE 1 on a measurement result of one or more LTE cells, the 5G UE 1 may transmit this RRC message on any LTE cell. The report on the measurement result to be transmitted on the New 5G CG may be distinguished from the report on the measurement result to be transmitted on the LTE CG, on the basis of a measurement instruction (e.g., MeasConfig IE) or a criterion defining a condition to trigger a measurement report event (e.g., ReportConfigEUTRA IE). For example, a measurement report event, where a cell (e.g., PSCell, special cell, or SCell) within the New 5G CG is a target, is defined. In this case, the 5G UE 1 may transmit a report on a measurement result triggered by this measurement report event on any cell within the New 5G CG. The measurement report event, where a cell within the New 5G CG is a target, may be defined as Inter-RAT measurement with respect to a LTE cell.

In a second implementation, the 5G UE 1 may determine which one of the New 5G CG and the LTE CG is to be used to transmit an RRC message depending on whether this RRC message includes a request message for the terminal (holding) information of the 5G UE 1 regarding the New 5G RAT (e.g., UE information request message) or depending on whether this RRC message includes a report message carrying the terminal (holding) information (e.g., UE information response message). That is, when an RRC message includes a report of (or a request for) the terminal (holding) information of the 5G UE 1 regarding the New 5G RAT, the 5G UE 1 may transmit (or receive) this RRC message on any cell within the New 5G CG. The base station system may receive (or transmit) this RRC message on any cell within the New 5G CG. In contrast, when an RRC message includes a report of (or a request for) the terminal (holding) information of the 5G UE 1 regarding the LTE RAT, the 5G UE 1 may transmit (or receive) this RRC message on any LTE cell. Further, the 5G UE 1 may determine which one of the New 5G CG and the LTE CG is to be used to transmit an RRC message depending on the type of the terminal (holding) information to be requested or reported. The type of the terminal (holding) information may be any one or any combination of:

Radio link-related information;
Random access-related information; and
Mobility history-related information.

The radio link-related information may be information regarding degradation of a radio quality (e.g., Radio Link Failure: RLF) in the LTE CG (e.g., PCell) or the New 5G CG (e.g., PSCell, Special cell) or information regarding a failure of radio link establishment (e.g., RRC Connection Establishment Failure: CEF, RRC Connection Re-establishment failure). For example, the information regarding degradation of a radio quality in the LTE CG may be requested or reported on the LTE CG (or the New 5G CG). In a similar way, the information regarding the degradation of a radio quality in the 5G CG may be requested or reported on the New 5G CG (or the LTE CG). In contrast, the information regarding a failure of radio link establishment may be always requested or reported on the LTE CG (or the New 5G CG). The radio link establishment may include a procedure using an RRC Connection Reconfiguration to change the configuration of the radio protocol(s) (e.g., RRC, PDCP, RLC, MAC, or PHY). Further, the 5G UE 1 may store the information regarding a failure of radio link establishment in the LTE CG and the information regarding a failure of radio link establishment in the New 5G CG separately from each other.

The random access (RACH)-related information may be the number of preamble transmissions it has taken to achieve the success of the random access and a flag indicating detection of a preamble contention. For example, the random access-related information regarding the LTE CG may be requested or reported on the LTE CG (or the New 5G CG). In a similar way, the random access-related information regarding the New 5G CG may be requested or reported on the New 5G CG (or on the LTE CG). The 5G UE 1 may store the number of preamble transmissions on the LTE CG and the number of preamble transmissions on the New 5G CG separately from each other.

The mobility history-related information (e.g., mobility history report) may be information regarding the cells which the 5G UE 1 visited (by the time it receives a request to report this information) (e.g., visited cell information list: VisitedCellInfoList). The visited cell information list may include at least one of: identification information (e.g., CGI, PCI, or Carrier frequency) of each cell that the 5G UE 1 visited; and information (e.g., timeSpent) about the time (e.g., seconds) the 5G UE 1 stayed in each cell. Further, the 5G UE 1 may store the history of the specific New 5G cell (e.g., PSCell, Special cell) to record information about visited cells specific to the New 5G RAT (e.g., VisitedCellInfoList-5G, Visited CellInfoList-SRAT). The visited cell information list regarding the LTE RAT may be requested or reported on the LTE CG, and meanwhile the visited cell information list regarding the New 5G RAT may be requested or reported on the 5G CG.

In a third implementation, the base station system may determine which one of the New 5G CG and the LTE CG is to be used to transmit an RRC message depending on whether this RRC message includes the security configuration information on the access stratum (AS) regarding one or more New 5G cells within the New 5G CG. That is, the base station system may transmit an RRC message on any cell within the New 5G CG when this RRC message includes the AS security configuration information regarding one or more New 5G cells. The 5G UE 1 may receive this RRC message on any cell within the New 5G CG. In contrast, the base station system may transmit an RRC message on any LTE cell when this RRC message includes the AS security configuration information regarding one or more LTE cells. The security configuration information may be transmitted as a NAS message (i.e., NAS PDU).

In a fourth implementation, the base station system may determine which one of the New 5G CG and the LTE CG is to be used to transmit an RRC message depending on whether this RRC message includes the AS-security-activation request for one or more New 5G cells within the New 5G CG. That is, the base station system may transmit an RRC message on any cell within the New 5G CG when this RRC message includes the AS-security-activation request for one more New 5G cells (e.g., Security Mode Command: SMC). The 5G UE 1 may receive this RRC message on any cell within the New 5G CG. In contrast, the base station system may transmit an RRC message on any LTE cell when this RRC message includes the AS-security-activation request for one or more LTE cells.

In a fifth implementation, the 5G UE 1 may determine which one of the New 5G CG and the LTE CG is to be used to transmit an RRC message depending on whether this RRC message includes the response to the AS-security-activation request for one or more New 5G cells (e.g., Security Mode Complete, Security Mode Failure). That is, the 5G UE 1 may transmit an RRC message on any cell within the New 5G CG when this RRC message includes the response to the AS-security-activation request for one or more New 5G cells. The base station system may receive this RRC message on any cell within the New 5G CG. In contrast, the 5G UE 1 may transmit an RRC message on any LTE cell when this RRC message includes the response to the AS-security-activation request for one or more LTE cells.

In a sixth implementation, the base station system may determine which one of the New 5G CG and the LTE CG is to be used to transmit an RRC message depending on whether this RRC message includes the configuration information specific to the New 5G RAT (e.g., SCG configuration for 5G, Secondary RAT (sRAT) configuration). That is, the base station system may transmit an RRC message on any cell within the New 5G CG when this RRC message includes the configuration information specific to the New 5G RAT. The 5G UE 1 may receive this RRC message on any cell within the New 5G CG. In contrast, the base station system may transmit an RRC message on any LTE cell when this RRC message includes configuration information specific to the LTE RAT. The configuration information specific to the New 5G RAT may be any one or any combination of:

Terminal capability-related information;
Service-related information; and
5G CG management-related information.

The terminal capability-related information may be a terminal capability(ies) regarding the New 5G RAT (e.g., UE-EUTRA-Capability AddSRAT, UE-EUTRA-Capability-SRAT), or may be a terminal response to a request (or an inquiry) from the base station system related to functions supported in a New 5G cell. The terminal capability-related information may be requested (e.g., via UE Capability Enquiry message) and reported (e.g., via UE Capability Information message) on the New 5G CG. In order to indicate that the terminal capability-related information regarding the New 5G RAT is requested, the RAT-Type within the UE-Capability Request IE may indicate "sRAT" or "eutra2", for example. At least a part of the terminal capabilities regarding the New 5G RAT required to connect to a New 5G cell may be transmitted on a LTE cell.

The service-related information may be control information required to achieve a service(s) provided in the New 5G CG (e.g., Radio resource configuration, Service area information, Service availability information, Service type/category information), or may be control information regarding a content of a service(s) (e.g., Content information, Scheduling/planning information). The service(s) here may indicate a service(s) that can be provided also in LTE, or may be a service(s) that can be provided only in 5G. The service(s) may include, for example, one of a Multimedia Broadcast and Multicast Service (MBMS) (i.e., MBMS over a Single Frequency Network (MBSFN), or single cell point to multipoint (SC-PTM)), a Cell Broadcast Service (CBS), Proximity Services (ProSe), Vehicle-to-Everything (V2X) services, and a Mobile Edge Computing (MEC).

The 5G CG management-related information may be information regarding a modification of a specific cell (e.g., PSCell, Special cell) within the New 5G CG (e.g., PSCell/Special cell reconfiguration, pSCellToAddMod-rlx). Further or alternatively, when the base station system adds or releases another New 5G cell (e.g., 5G SCell) for the 5G UE 1 after the base station system configures the specific New 5G cell (e.g., PSCell, Special cell) for the 5G UE 1 (that is, after the specific 5G cell becomes available), the base station system may transmit radio resource configuration information about this other New 5G cell (e.g., sCellToAddMod-ListSRAT, sCellToReleaseListSRAT, RadioResourceConfigDedicatedSCellSRAT) as the 5G CG management-related information. That is, the information relating to addition/release of a cell within the New 5G CG and the information relating to modification of the specific New 5G cell may be transmitted on any cell within the New 5G CG.

Although basic configuration information required by the 5G UE 1 to connect to (or detect) a New 5G cell is configuration information specific to the New 5G RAT, it may be transmitted on a LTE cell. This basic configuration information may be, for example, information regarding a subframe structure (which is different from that of LTE), information regarding a TTI length, information regarding a sampling rate, or information regarding a cell type.

In a sixth implementation, the base station system may determine which one of the New 5G CG and the LTE CG is to be used to transmit an RRC message depending on whether this RRC message includes control information newly defined by the 3GPP for New 5G cells. That is, the base station system may transmit an RRC message on any cell within the New 5G CG when this RRC message includes control information newly defined for New 5G cells. The 5G UE 1 may receive this RRC message on any cell within the New 5G CG. In contrast, the base station system may transmit an RRC message on any LTE cell when this RRC message includes existing control information for LTE. The control information for New 5G cells may be any one or a combination of:

Core network selection-related information; and
Information regarding a standalone operation of a New 5G cell(s).

The core network selection-related information may be information regarding a new type core network associated with introduction of the New 5G RAT (e.g., the 5G specific EPC 42: this network is also referred to as a 5G Dedicated Core Network (DCN)). For example, the core network selection-related information may be identification information (e.g., MME ID, MMEC, GUMMEI, MMEGI, GUTI, TAI, or TEID) of a core network node (e.g., MME, S-GW, or P-GW), or may be a request (or a notification) for switch of the connection with the core network node (e.g., Reroute Command, Reroute Request, Reroute indication, DCN selection information, or DCN relocation information). Such information is required when the connection is switched from the integrated EPC 41 to the 5G specific EPC 42 or vice versa. Further or alternatively, the core network selection-related information may be assistance information to select the 5G specific EPC (5G DCN) 42. This assistance information may be, for example, a terminal type (e.g., device type), a usage type (e.g., UE usage type), or information about an expected (or preferred) core network (e.g., expected/preferred CN information). The core network selection-related information may be transmitted as a NAS message (i.e., NAS PDU).

The information regarding the standalone operation of a New 5G cell(s) may be configuration information (e.g., Radio resource configuration for 5G/SRAT PCell) that is required to use a New 5G cell as a primary cell (PCell) instead of using a New 5G cell as a secondary cell (SCell) with the LTE PCell cell. Alternatively, the information regarding the standalone operation of a New 5G cell(s) may be information (e.g., Handover to a 5G/SRAT cell or Redirection to a 5G/SRAT cell) indicating a request or an indication that a New 5G cell is to be used as the PCell. Such information may be transmitted in a signalling radio bearer (e.g., SRBx) that will be newly defined. In addition, information required to configure this SRBx may be transmitted on a New 5G cell or on a LTE cell.

In the above-described first to sixth implementations, the 5G UE 1 and the base station system determine which one of the New 5G CG and the LTE CG is to be used to transmit an RRC message depending on whether this RRC message relates to the New 5G RAT (or a New 5G cell(s)). Accordingly, the 5G UE 1 and the base station system are able to transmit or receive RRC messages relating to the New 5G RAT (or a New 5G cell(s)) through any cell within a New 5G CG. This, for example, contributes to transmission of RRC messages regarding the New 5G RAT (or a New 5G cell(s)) with low latency.

In a seventh implementation, the 5G UE 1 may determine which one of the New 5G CG and the LTE CG is to be used to transmit a CP message (i.e., an RRC message or a NAS message) depending on whether to transmit this CP message via a specific signalling radio bearer associated with the New 5G RAT. That is, the 5G UE 1 may transmit a CP message on any cell within the New 5G CG when the 5G UE 1 transmits this CP message via the specific signalling radio bearer associated with the New 5G RAT. The base station system may receive this CP message on any cell within the New 5G CG. The specific signalling radio bearer may be SRB0, SRB1, or SRB2 of LTE, or may be a new signalling radio bearer (e.g., SRBx). In contrast, the 5G UE 1 may transmit a CP message on any LTE cell when the 5G UE 1 transmits this CP message via a specific signalling radio bearer associated with the LTE RAT.

In a similar way, in an eighth implementation, the base station system may determine which one of the New 5G CG and the LTE CG is to be used to transmit a CP message (i.e., an RRC message or a NAS message) depending on whether to transmit this CP message via a specific signalling radio bearer associated with the New 5G RAT. That is, the base station system may transmit a CP message on any cell within the New 5G CG when the base station system transmits this CP message via the specific signalling radio bearer associated with the New 5G RAT. The 5G UE 1 may receive this CP message on any cell within the New 5G CG. In contrast, the base station system may transmit a CP message on any LTE cell when the base station system transmits this CP message via a specific signalling radio bearer associated with the LTE RAT.

In the above-described seventh and eighth implementations, the 5G UE 1 and the base station system determine which one of the New 5G CG and the LTE CG is to be used to transmit a CP message depending on whether the CP message is transmitted on the specific bearer associated with the New 5G RAT. Accordingly, the 5G UE 1 and the base station system are able to transmit or receive CP messages relating to the New 5G RAT (or the New 5G cell(s)) through any cell within the New 5G CG. This, for example, contributes to transmission of CP messages regarding the New 5G RAT (or a New 5G cell(s)) with low latency.

In a ninth implementation, the 5G UE 1 may determine which one of the New 5G CG and the LTE CG is to be used to transmit a CP message (i.e., an RRC message or a NAS message) depending on whether the transmission cause of this CP message indicates degradation of a radio quality of any New 5G cell. That is, the 5G UE 1 may transmit a CP message on any cell within the New 5G CG when this CP message is transmitted due to degradation of the radio quality of any New 5G cell. The base station system may receive this CP message on any cell within the New 5G CG. This, for example, contributes to transmission of CP messages regarding the New 5G RAT (or a New 5G cell(s)) with low latency. In contrast, the 5G UE 1 may transmit an RRC message containing a NAS message on any LTE cell when the transmission cause of the CP message indicates degradation of a radio quality of any LTE cell.

In a tenth implementation, the 5G UE 1 may determine which one of the New 5G CG and the LTE CG is to be used to transmit a NAS message depending on whether the core network associated with this NAS message is a new type core network (e.g., the 5G specific EPC 42) associated with introduction of the New 5G RAT. That is, the 5G UE 1 may transmit an RRC message containing a NAS message on any cell within the New 5G CG when the core network associated with this NAS message is the new type core network associated with introduction of the New 5G RAT. The base station system may receive the RRC message containing this NAS message on any cell within the New 5G CG. This, for example, contributes to transmission of NAS messages regarding the new type core network, which is associated with introduction of the New 5G RAT, with low latency. In contrast, the 5G UE 1 may transmit an RRC message containing a NAS message on any LTE cell when the core network associated with this NAS message is another core network (e.g., the integrated EPC 41).

In a similar way, in an eleventh implementation, the base station system may determine which one of the New 5G CG and the LTE CG is to be used to transmit a NAS message depending on whether the core network associated with this NAS message is a new-type core network (e.g., the 5G specific EPC 42) associated with introduction of the New 5G RAT. That is, the base station system may transmit an RRC message containing a NAS message on any cell within the New 5G CG when the core network associated with this NAS message is the new type core network associated with introduction of the New 5G RAT. The 5G UE 1 may receive the RRC message containing this NAS message on any cell within the New 5G CG. In contrast, the base station system may transmit an RRC message containing a NAS message on any LTE cell when the core network associated with this NAS message is another core network (e.g., the integrated EPC 41).

In the aforementioned first to eleventh implementations, the transmission or reception of RRC messages may be performed in a specific cell in the LTE CG or the New 5G CG. For example, when an RRC message is transmitted or received on the LTE CG, a primary cell (PCell) may be used. Alternatively, when an RRC message is transmitted or received on the New 5G CG, a primary secondary cell (PSCell) may be used. The PCell and the PSCell may be collectively referred to as a special cell (SpCell).

In some implementations, the LTE+eNB 5 may send, to the 5G specific eNB 6, a CP message to be transmitted on a New 5G cell or information regarding this message. Further or alternatively, the 5G specific eNB 6 may send, to the LTE+eNB 5, a CP message that is to be transmitted or has been received (i.e., has been transmitted from the 5G UE 1) on a New 5G cell or information regarding this message. Further, the 5G specific eNB 6 may send and receive control-plane information (i.e., a CP message (e.g., a NAS message, an S1 Application Protocol (S1AP) message)) to and from a node(s) (e.g., MME) in a core network (e.g., the integrated EPC 41 or the 5G specific EPC 42).

Figure 7:
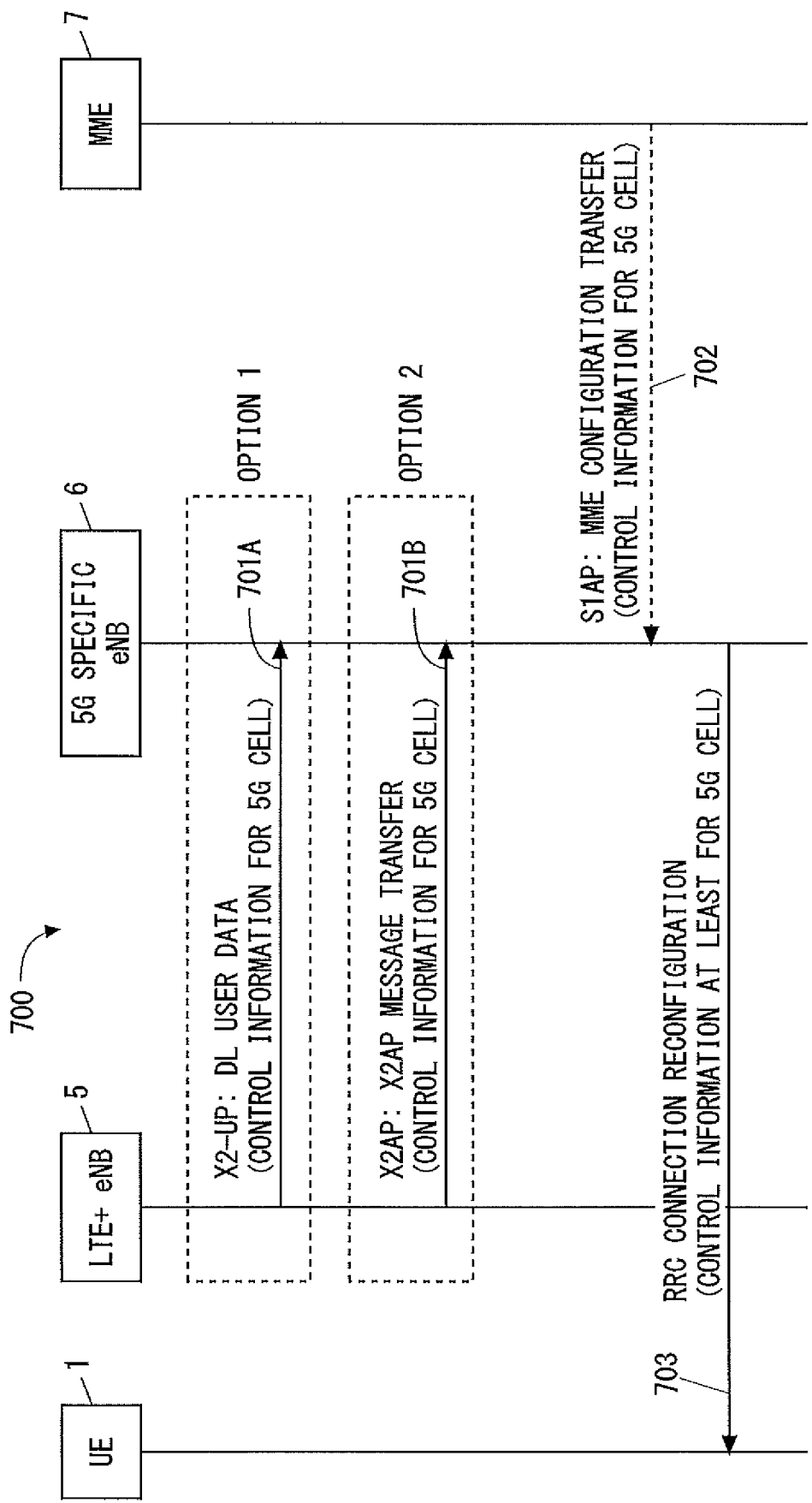
FIG. 7 is a sequence diagram showing one example of operations of a radio terminal and a base station according to a first embodiment.

FIG. 7 shows an example in which the LTE+eNB 5 sends control-plane information (i.e., CP message) regarding a New 5G cell(s) to the 5G specific eNB 6. In Step 701A or 701B, the 5G specific eNB 6 receives an X2 message containing at least control-plane information (i.e., CP message) regarding a New 5G cell(s) from the LTE+eNB 5. This X2 message may be a DL USER DATA message of the X2 User Plane Protocol (X2-UP) (Step 701A) or may be a DL CONTROL DATA message that will be newly defined. This X2 message may be an X2 AP Message Transfer message of the X2AP (Step 701B). Alternatively, this X2 message may be an SeNB Modification Request message (e.g., MeNB to SeNB Container) defined for Dual Connectivity or may be an X2 message (e.g., SeNB Configuration Request message) that will be newly defined.

Further or alternatively, the 5G specific eNB 6 may receive an S1AP message containing control-plane information regarding a New 5G cell(s) from the integrated EPC 41 (e.g., the MME 7) or the 5G specific EPC 42 (Step 702). This SAP message may be an MME Configuration Transfer message, an MME Direct Information Transfer message, or another S1AP message. In Step 703, the 5G specific eNB 6 transmits an RRC Connection Reconfiguration message containing the control-plane information (i.e., CP message) regarding a New 5G cell(s), which has been received from the LTE+eNB 5, the integrated EPC 41, or the 5G specific EPC 42, to the 5G UE 1 on a New 5G cell.

Figure 8:
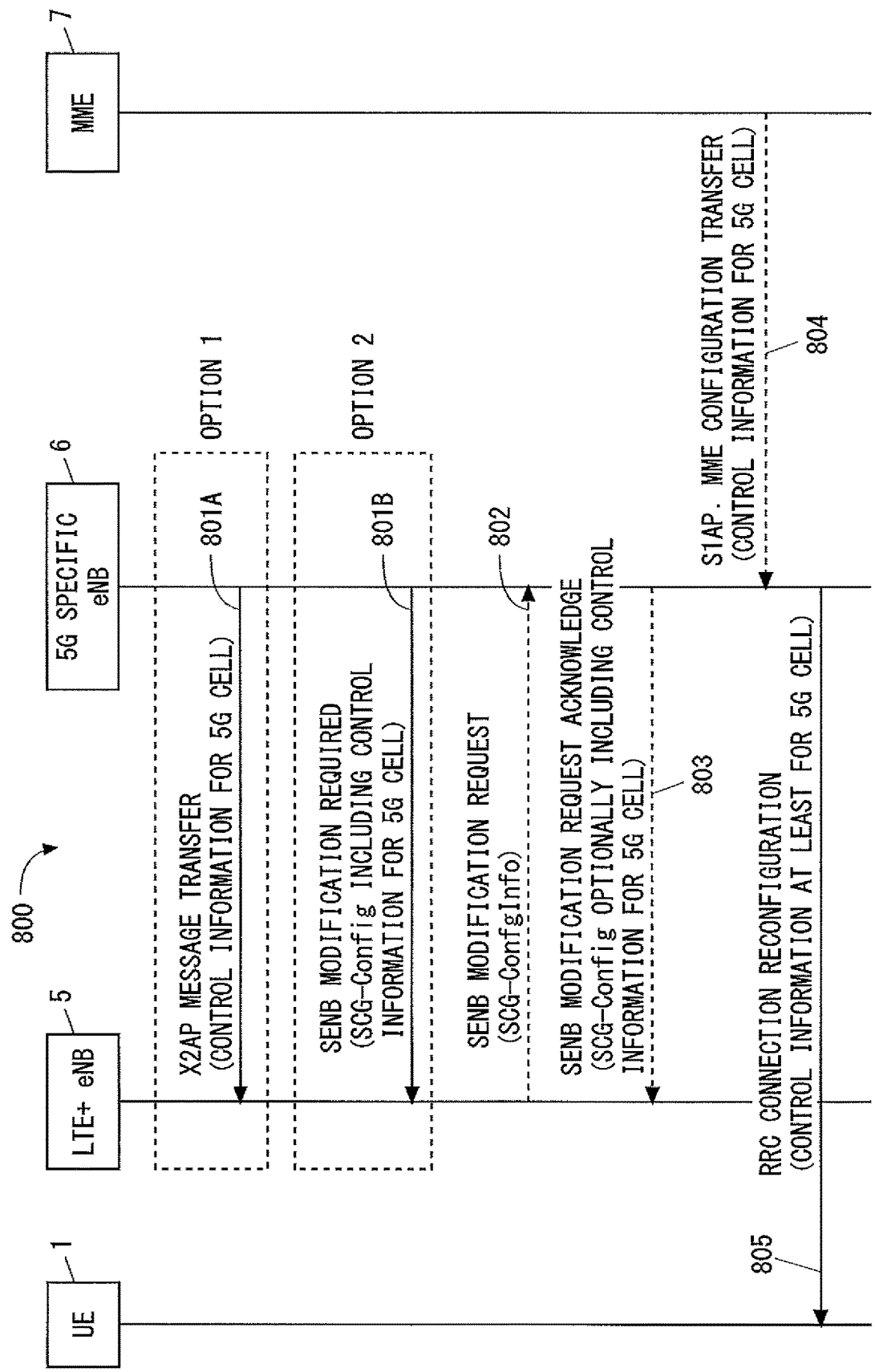
FIG. 8 is a sequence diagram showing one example of operations of the radio terminal and the base station according to the first embodiment.

FIG. 8 shows an example in which the 5G specific eNB 6 sends control-plane information (i.e., CP message) regarding a New 5G cell(s) to the LTE+eNB 5. In Step 801A or 801B, the 5G specific eNB 6 sends an X2 message containing at least control-plane information (i.e., CP message) regarding a New 5G cell(s) to the LTE+eNB 5. This X2 message may be an X2AP Message Transfer message (Step 801A). Alternatively, this X2 message may be an SeNB Modification Required message defined for Dual Connectivity (Step 801B).

The LTE+eNB 5 may start an SeNB Modification procedure in response to the reception of the X2 message. For example, the LTE+eNB 5 may send an SeNB Modification Request message (containing an RRC Container (i.e., SCG-ConfigInfo)) to the 5G specific eNB 6 (Step 802). In response to the reception of the SeNB Modification Request message, the 5G specific eNB 6 may send an SeNB Modification Request Acknowledge message (containing an RRC Container (i.e., SCG-Config)) to the LTE+eNB 5 (Step 803). In Step 803, the 5G specific eNB 6 may send control-plane information regarding a 5G cell(s) to the LTE+eNB 5.

The 5G specific eNB 6 may receive an S1AP message containing control-plane information regarding a New 5G cell(s) from the integrated EPC 41 (e.g., the MME 7) or the 5G specific EPC 42 (Step 804). The 5G specific eNB 6 may perform Step 801A or 801B in response to receiving control-plane information regarding a 5G cell(s) from the integrated EPC 41 or the 5G specific EPC 42.

In Step 805, the 5G specific eNB 6 transmits an RRC Connection Reconfiguration message containing the control-plane information (the CP message) regarding a New 5G cell(s) to the 5G UE 1 on a New 5G cell.

Figure 9:
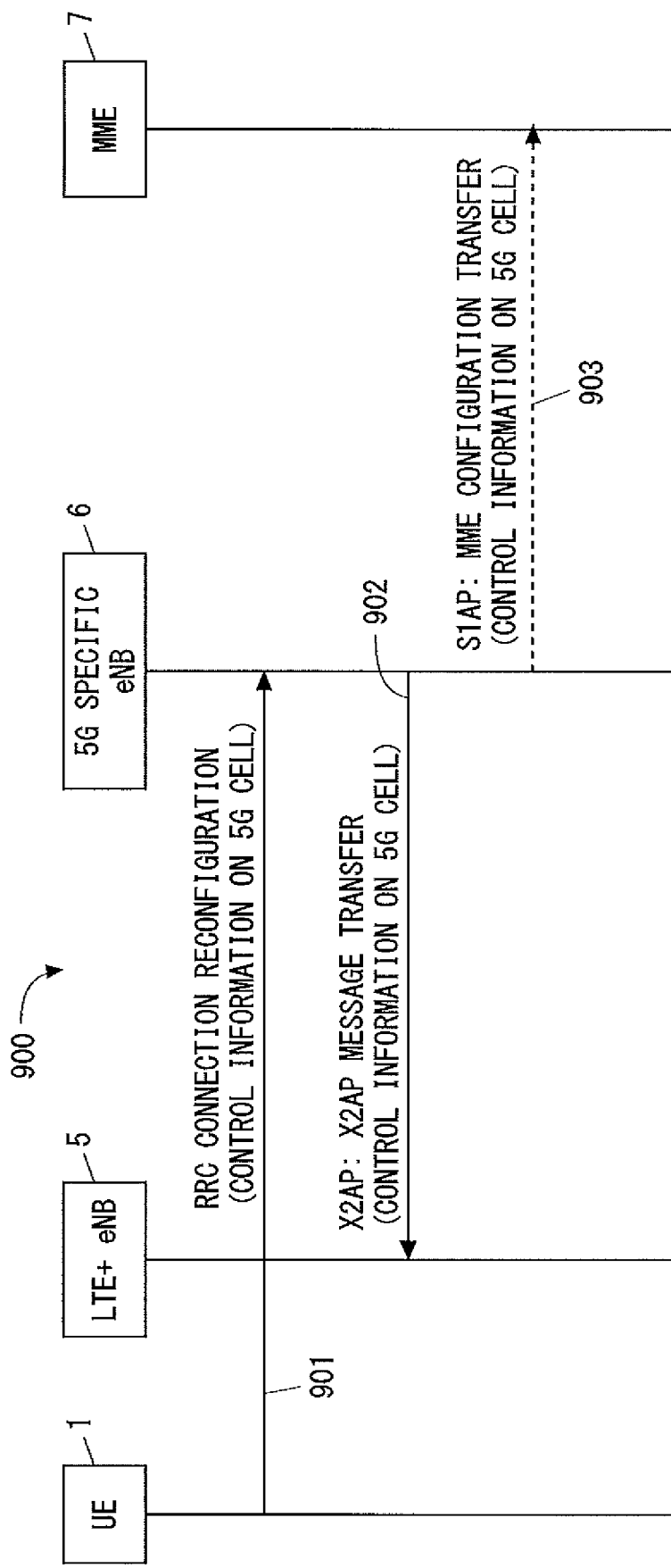
FIG. 9 is a sequence diagram showing one example of operations of the radio terminal and the base station according to the first embodiment.

FIG. 9 shows another example in which the 5G specific eNB 6 sends control-plane information (i.e., CP message) regarding a New 5G cell(s) to the LTE+eNB 5. In Step 901, the 5G specific eNB 6 receives control-plane information from the 5G UE 1 on a 5G cell. In Step 902, the 5G specific eNB 6 sends, to the LTE+eNB 5, an X2 message containing at least a part of the control-plane information received from the 5G UE 1. This X2 message may be an X2AP Message Transfer message, or may be an X2 message that will be newly defined (e.g., SeNB Configuration Update message). The 5G specific eNB 6 may generate other control information in response to receiving the control-plane information from the 5G UE 1 and send the generated control information to the LTE+eNB 5 in Step 902.

Further, the 5G specific eNB 6 may send an SAP message containing at least a part of the control-plane information received from the 5G UE 1 to the integrated EPC 41 (e.g., the MME 7) or the 5G specific EPC 42 (Step 903). This S1AP message may be an eNB Configuration Transfer message, an eNB Direct Information Transfer message, or another S1AP message. The 5G specific eNB 6 may generate other control information in response to receiving the control-plane information from the 5G UE 1 and send the generated control information to the integrated EPC 41 (e.g., the MME 7) or the 5G specific EPC 42 in Step 903.

Figures 10, 11:
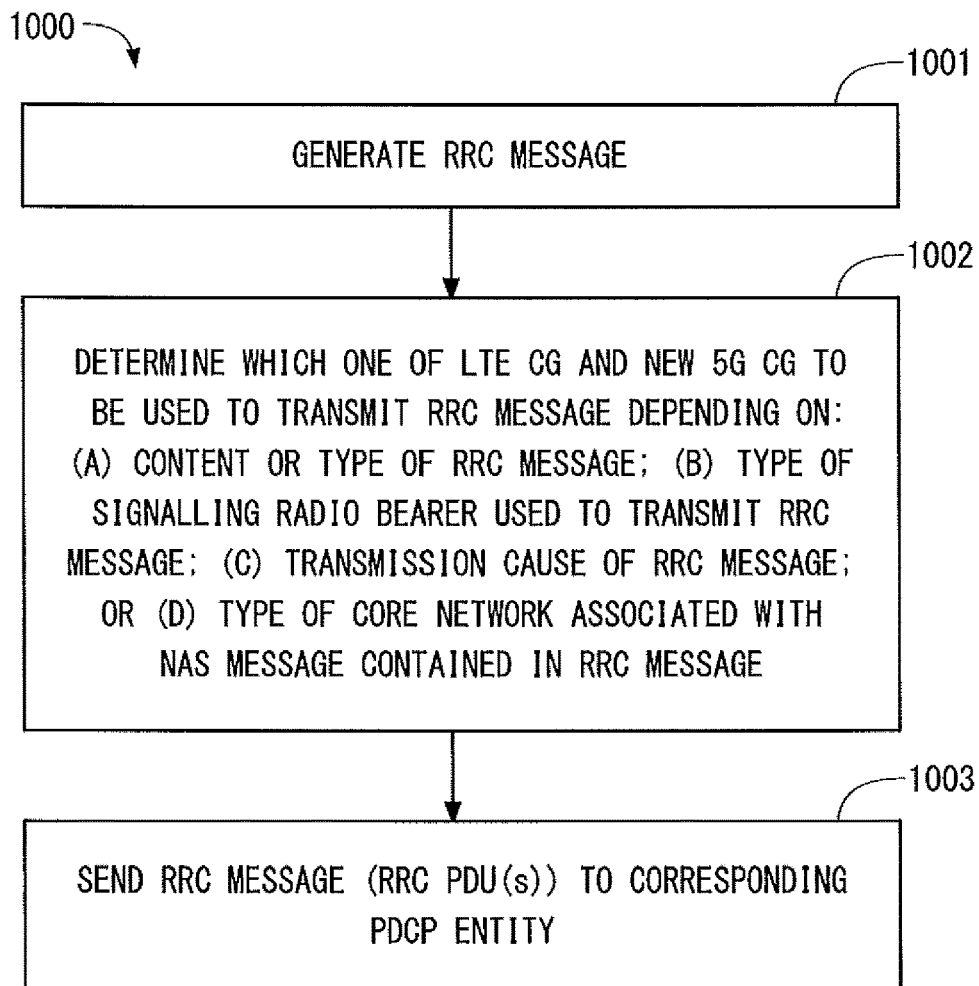
FIG. 10 is a flowchart showing one example of operations of an RRC layer according to the first embodiment.
FIG. 11 is a table showing an example of a key used to generate a temporary key for ciphering/deciphering of each radio bearer according to a second embodiment.

FIG. 10 is a flowchart showing one example (Process 1000) of the operation of transmitting a CP message performed by the 5G UE 1 and the base station system. In Step 1001, the RRC layer (i.e., the integrated RRC layer 401 or the New RRC layer 511) generates an RRC message. This RRC message may be an RRC message carrying a NAS message (e.g., a UL Information Transfer message or a DL Information Transfer message).

In Step 1002, the RRC layer determines which one of the LTE CG and the New 5G CG is to be used to transmit the RRC message depending on: (a) a content or type of this RRC message; (b) a type of a signalling radio bearer used to transmit this RRC message; (c) a transmission cause of this RRC message; or (d) a type of a core network associated with the NAS message contained in this RRC message. As already described above, for example, when the content or type of this RRC message relates to the New 5G RAT or a New 5G cell(s), the RRC layer may transmit this RRC message via any New 5G cell.

In Step 1003, the RRC layer sends this message to the PDCP entity that corresponds to the cell to be used for transmission of the RRC message determined in Step 1002. Accordingly, the 5G UE 1 and the base station system are able to control which one of the LTE CG and the New 5G CG is to be used to transmit an RRC message or a NAS message contained therein.

Second Embodiment

The examples of a radio communication network and a radio protocol stack according to this embodiment are similar to those shown in FIGS. 1-6. In this embodiment, selection of a key $K_{eNB}$ to derive temporary keys (e.g., KUPenc, KRRCin) used by each PDCP entity in the PDCP layer (i.e., the integrated PDCP layer 602 or the New PDCP layer 512) will be explained. These temporary keys are used by each PDCP entity, for example, to cipher and decipher the user plane (UP) traffic and the RRC traffic. These temporary keys are derived from the key $K_{eNB}$ by the 5G UE 1. In a similar way, these temporary keys are derived from the key $K_{eNB}$ by the integrated eNB 2, the LTE+eNB 5, or the 5G specific eNB 6.

In some implementations, the 5G UE 1 and the integrated eNB 2 (or the LTE+eNB 5 and the 5G specific eNB 6) may use the first key $K_{eNB}$ to cipher and decipher data of a radio bearer(s) of a certain bearer type and use the second key sub-$K_{eNB}$ to cipher and decipher data of a radio bearer(s) of another bearer type. The second key sub-$K_{eNB}$ may be derived from the first key $K_{eNB}$, similar to the key S-$K_{eNB}$ used for SCG bearers in Dual Connectivity (DC).

As shown in FIG. 11, for example, the 5G UE 1 and the integrated eNB 2 (or the LTE+eNB 5 and the 5G specific eNB 6) may use the first key $K_{eNB}$ to cipher and decipher data of LTE bearers (e.g., the radio bearer #1 shown in FIG. 6) and integrated bearers (e.g., the radio bearer #3 shown in FIG. 6) and use the second key sub-$K_{eNB}$ to cipher and decipher data of New 5G bearers (e.g., the radio bearer #2 shown in FIG. 6).

In the case of the Co-located deployments (FIGS. 1 and 2), for example, the 5G UE 1 and the integrated eNB 2 may use the first key $K_{eNB}$ to transmit RRC messages through LTE bearers and use the same first key $K_{eNB}$ to transmit RRC messages through New 5G bearers. In contrast, in the case of the non co-located deployments (FIG. 3), the 5G UE 1 and the LTE+eNB 5 may use the first key $K_{eNB}$ to transmit RRC messages through LTE bearers and, meanwhile, use the second key sub-$K_{eNB}$ to transmit RRC messages through New 5G bearers.

Figure 12:
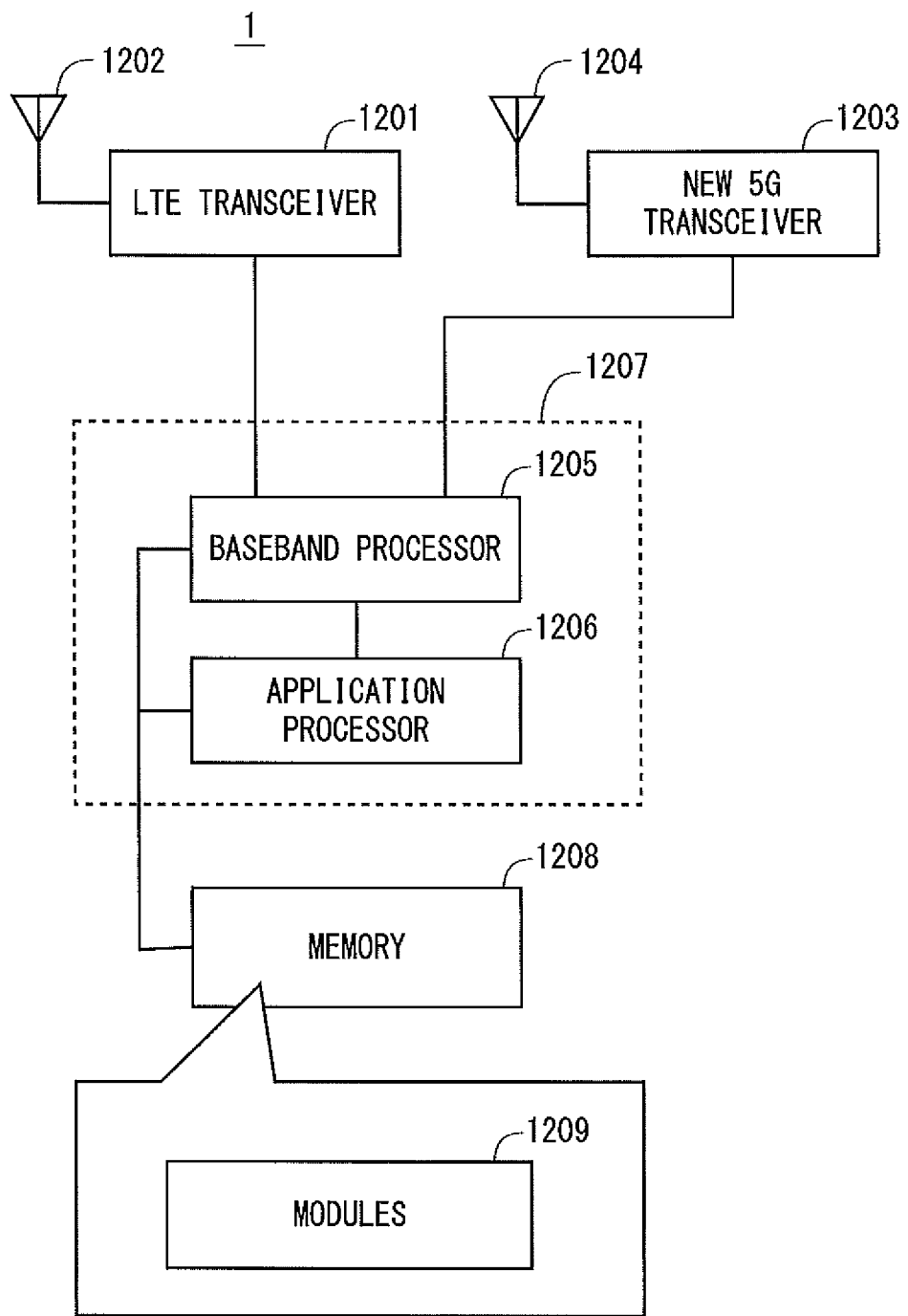
FIG. 12 is a block diagram showing a configuration example of a radio terminal according to the several embodiments.

In the following, configuration examples of the 5G UE 1, the integrated eNB 2, the LTE+eNB 5, and the 5G specific eNB 6 according to the above embodiments will be described. FIG. 12 is a block diagram showing a configuration example of the 5G UE 1. An LTE transceiver 1201 performs analog RF signal processing regarding the PHY layer of the LTE RAT to communicate with the integrated eNB 2 (or the LTE+eNB 5). The analog RF signal processing performed by the LTE transceiver 1301 includes frequency up-conversion, frequency down-conversion, and amplification. The LTE transceiver 1201 is coupled to an antenna 1202 and a baseband processor 1205. That is, the LTE transceiver 1201 receives modulated symbol data (or OFDM symbol data) from the baseband processor 1205, generates a transmission RF signal, and supplies the transmission RF signal to the antenna 1202. Further, the LTE transceiver 1201 generates a baseband reception signal based on a reception RF signal received by the antenna 1202, and supplies the baseband reception signal to the baseband processor 1205.

A New 5G transceiver 1203 performs analog RF signal processing regarding the PHY layer of the New 5G RAT r to communicate with the integrated eNB 2 (or the 5G specific eNB 6). The New 5G transceiver 1203 is coupled to an antenna 1204 and the baseband processor 1205.

The baseband processor 1205 performs digital baseband signal processing (data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signalling regarding attach, mobility, and packet communication).

In the case of LTE and LTE-Advanced, for example, the digital baseband signal processing performed by the baseband processor 1205 may include signal processing of a Packet Data Convergence Protocol (PDCP) layer, a Radio Link Control (RLC) layer, a MAC layer, and a PHY layer. Further, the control-plane processing performed by the baseband processor 1205 may include processing of a Non-Access Stratum (NAS) protocol, an RRC protocol, and MAC CEs.

The baseband processor 1205 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1206 described in the following.

The application processor 1206 is also referred to as a CPU, an MPU, a microprocessor, or a processor core. The application processor 1206 may include a plurality of processors (processor cores). The application processor 1206 loads a system software program (Operating System (OS))

and various application programs (e.g., communication application that acquires metering data or sensing data) from a memory 1208 or a memory (not shown) and executes these programs, thereby providing various functions of the 5G UE 1.

In some implementations, as represented by a dashed line (1207) in FIG. 12, the baseband processor 1205 and the application processor 1206 may be integrated on a single chip. In other words, the baseband processor 1205 and the application processor 1206 may be implemented in a single System on Chip (SoC) device 1207. An SoC device may be referred to as a system Large Scale Integration (LSI) or a chipset.

The memory 1208 is a volatile memory, a non-volatile memory, or a combination thereof. The memory 1208 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1208 may include, for example, an external memory device that can be accessed from the baseband processor 1205, the application processor 1206, and the SoC 1207. The memory 1208 may include an internal memory device that is integrated in the baseband processor 1205, the application processor 1206, or the SoC 1207. Further, the memory 1208 may include a memory in a Universal Integrated Circuit Card (UICC).

The memory 1208 may store one or more software modules (computer programs) 1209 including instructions and data to perform the processing by the 5G UE 1 described in the above embodiments. In some implementations, the baseband processor 1205 or the application processor 1206 may load these software modules 1209 from the memory 1208 and execute the loaded software modules, thereby performing the processing of the 5G UE 1 described in the above embodiments.

Figure 13:
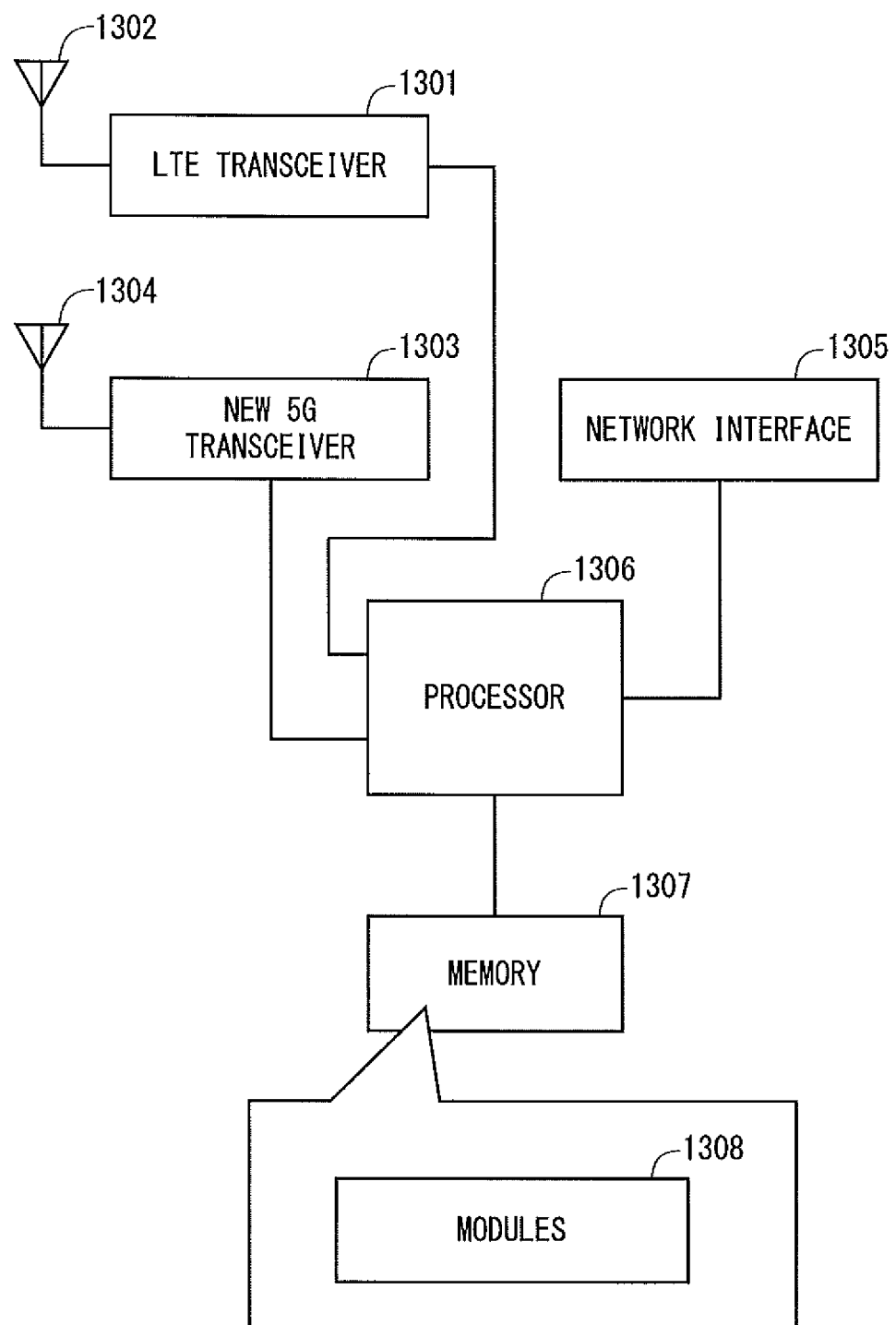
FIG. 13 is a block diagram showing a configuration example of a base station according to the several embodiments.

FIG. 13 is a block diagram showing a configuration example of the integrated eNB 2 according to the above embodiments. Referring to FIG. 13, the eNB 2 includes an LTE transceiver 1301, a New 5G transceiver 1303, a network interface 1305, a processor 1306, and a memory 1307. The LTE transceiver 1301 performs analog RF signal processing regarding the PHY layer of the LTE RAT to communicate with the 5G UE 1 via an LTE cell. The LTE transceiver 1301 may include a plurality of transceivers. The LTE transceiver 1301 is coupled to an antenna 1302 and the processor 1306.

The New 5G transceiver 1303 performs analog RF signal processing regarding the PHY layer of the New 5G RAT to communicate with the 5G UE 1 via a New 5G cell. The New 5G transceiver 1303 is coupled to an antenna 1304 and the baseband processor 1306.

The network interface 1305 is used to communicate with a network node in the integrated EPC 41 or the 5G specific EPC 42 (e.g., a Mobility Management Entity (MME) and a Serving Gateway (S-GW)), and to communicate with other eNBs. The network interface 1305 may include, for example, a network interface card (NIC) conforming to the IEEE 802.3 series.

The processor 1306 performs digital baseband signal processing (data-plane processing) and control-plane processing for radio communication. In the case of LTE and LTE-Advanced, for example, the digital baseband signal processing performed by the processor 1306 may include signal processing of the PDCP layer, the RLC layer, the MAC layer, and the PHY layer. Further, the control-plane processing performed by the processor 1306 may include processing of the S1 protocol, the RRC protocol, and MAC CEs.

The processor 1306 may include a plurality of processors. The processor 1306 may include, for example, a modem processor (e.g., DSP) that performs the digital baseband signal processing and a protocol stack processor (e.g., a CPU or an MPU) that performs the control-plane processing.

The memory 1307 is composed of a combination of a volatile memory and a non-volatile memory. The volatile memory is, for example, an SRAM, a DRAM, or a combination thereof. The non-volatile memory is, for example, an MROM, a PROM, a flash memory, a hard disc drive, or a combination thereof. The memory 1307 may include a storage located apart from the processor 1306. In this case, the processor 1306 may access the memory 1307 via the network interface 1305 or an I/O interface (not shown).

The memory 1307 may store a software module(s) (computer program) 1308 including instructions and data for performing processing by the integrated eNB 2 described in the above embodiments. In some implementations, the processor 1306 may be configured to load the software module(s) 1308 from the memory 1307 and execute the loaded software module(s), thereby performing processing of the integrated eNB 2 described in the above embodiments.

The configurations of the LTE+eNB 5 and the 5G specific eNB 6 may be similar to the configuration of the integrated eNB 2 shown in FIG. 13. However, the LTE+eNB 5 does not need to include the New 5G transceiver 1303 and the 5G specific eNB 6 does not need to include the LTE transceiver 1301.

As described above with reference to FIGS. 12 and 13, each of the processors included in the 5G UE 1, the integrated eNB 2, the LTE+eNB 5, and the 5G specific eNB 6 according to the aforementioned embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

Each of the above-described embodiments may be used individually, or two or more embodiments may be appropriately combined with one another.

The protocol stacks described in the above embodiments are merely examples and another protocol stack may be used to achieve interworking of the LTE RAT and the New 5G RAT. In some implementations, the existing protocol stacks for LTE/LTE-Advanced Carrier Aggregation (CA) or Dual Connectivity (DC), or any modification thereof may be used to achieve interworking of the LTE RAT and the New 5G RAT. In the co-located deployments or the co-located RAN, for example, an integrated MAC layer (or sublayer) may be used in place of the integrated PDCP layer (or sublayer). In this case, the integrated MAC layer may control the LTE PHY layer and the New PHY layer and perform CA using the LTE cell and the New 5G cell.

The base station, the base station system, the Integrated eNB 2, the LTE+eNB 5, the 5G specific eNB 6, the BBU (or the DU), and the RRH (or the RU) described in the aforementioned embodiments may be each referred to as a radio station or a radio access network (RAN) node. In other words, the processing and the operations performed by the base station, the base station system, the Integrated eNB 2, the LTE+eNB 5, the 5G specific eNB 6, the BBU (DU), or the RRH (RU) described in the above embodiments may be provided by any one or more radio stations (i.e., RAN nodes).

Further, the above-described embodiments are merely examples of applications of the technical ideas obtained by the inventors. Needless to say, these technical ideas are not limited to the above-described embodiments and various modifications can be made thereto.

For example, the whole or part of the embodiments disclosed above can be described as, but not limited to, the following supplementary notes.

(Supplementary Note 1)
A radio station system comprising:
one or more radio stations configured to:
simultaneously provide, for one radio terminal, at least one first cell in accordance with a first radio access technology and at least one second cell in accordance with a second radio access technology and used in addition and subordinate to the at least one first cell to one radio terminal; and
transmit or receive a control-plane message to or from the radio terminal on the at least one second cell when a predetermined condition is satisfied, wherein
the control-plane message includes a non-access stratum (NAS) message or a radio resource control (RRC) message or both, and
the predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

(Supplementary Note 2)
The radio station system according to Supplementary Note 1, wherein
the predetermined condition relates to the content or type of the control-plane message, and
the one or more radio stations are configured to transmit or receive the control-plane message on the at least one second cell when the control-plane message comprises: a request for terminal measurement regarding the at least one second cell sent to the radio terminal; or a report on a measurement result regarding the at least one second cell sent from the radio terminal.

(Supplementary Note 3)
The radio station system according to Supplementary Note 1, wherein
the predetermined condition relates to the content or type of the control-plane message, and
the one or more radio stations are configured to transmit or receive the control-plane message on the at least one second cell when the control-plane message comprises: a request for terminal information of the radio terminal regarding the second radio access technology sent to the radio terminal; or a report on the terminal information sent from the radio terminal.

(Supplementary Note 4)
The radio station system according to Supplementary Note 1, wherein
the predetermined condition relates to the content or type of the control-plane message, and
the one or more radio stations are configured to transmit the control-plane message on the at least one second cell when the control-plane message comprises security configuration information about an access stratum (AS) for the at least one second cell.

(Supplementary Note 5)
The radio station system according to Supplementary Note 1, wherein
the predetermined condition relates to the content or type of the control-plane message, and
the one or more radio stations are configured to transmit or receive the control-plane message on the at least one second cell when the control-plane message comprises: a request for access-stratum (AS)-security activation for the at least one second cell sent to the radio terminal; or a response to the request from the radio terminal.

(Supplementary Note 6)
The radio station system according to Supplementary Note 1, wherein
the predetermined condition relates to the content or type of the control-plane message, and
the one or more radio stations are configured to transmit the control-plane message on the at least one second cell when the control-plane message includes configuration information specific to the second radio access technology.

(Supplementary Note 7)
The radio station system according to Supplementary Note 1, wherein
the predetermined condition relates to the type of the signalling radio bearer used to transmit the control-plane message, and
the one or more radio stations are configured to transmit or receive the control-plane message on the at least one second cell when the control-plane message is transmitted via a specific signalling radio bearer associated with the second radio access technology.

(Supplementary Note 8)
The radio station system according to Supplementary Note 1, wherein
the predetermined condition relates to a transmission cause of the control-plane message, and
the one or more radio stations are configured to receive the control-plane message on the at least one second cell when the control-plane message is transmitted due to degradation of a radio quality of the at least one second cell.

(Supplementary Note 9)
The radio station system according to Supplementary Note 1, wherein
the predetermined condition relates to the type of the core network associated with the NAS message, and
the one or more radio stations are configured to transmit or receive the control-plane message containing the NAS message on the at least one second cell when the core network is a new type core network associated with introduction of the second radio access technology.

(Supplementary Note 10)

The radio station system according to any one of Supplementary Notes 1 to 9, wherein the one or more radio stations are configured to provide Radio Link Control (RLC) and Medium Access Control (MAC) layers to communicate with the radio terminal in accordance with the first radio access technology, Radio Link Control (RLC) and Medium Access Control (MAC) layers to communicate with the radio terminal in accordance with the second radio access technology, a common Packet Data Convergence Protocol (PDCP) layer associated with both of the two RLC layers, and a common RRC layer associated with the common PDCP layer.

(Supplementary Note 11)

The radio station system according to any one of Supplementary Notes 1 to 9, wherein
the one or more radio stations comprise a first radio station for the first radio access technology and a second radio station for the second radio access technology,
the second radio station provides Radio Link Control (RLC) and Medium Access Control (MAC) layers to communicate with the radio terminal in accordance with the second radio access technology, and
the first radio station is configured to provide Radio Link Control (RLC) and Medium Access Control (MAC) layers to communicate with the radio terminal in accordance with the first radio access technology, a common Packet Data Convergence Protocol (PDCP) layer associated with both of the two RLC layers, and a common RRC layer associated with the common PDCP layer.

(Supplementary Note 12)

The radio station system according to any one of Supplementary Notes 1 to 11, wherein
the first radio access technology is continuous enhancement of LTE and LTE-Advanced, and
the second radio access technology is a new 5G radio access technology.

(Supplementary Note 13)

A method in a radio station system including one or more radio stations, the method comprising:
simultaneously providing, for one radio terminal, at least one first cell in accordance with a first radio access technology and at least one second cell in accordance with a second radio access technology and used in addition and subordinate to the at least one first cell; and
transmitting or receiving a control-plane message to or from the radio terminal on the at least one second cell when a predetermined condition is satisfied, wherein
the control-plane message includes a non-access stratum (NAS) message or a radio resource control (RRC) message or both, and
the predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

(Supplementary Note 14)

A radio terminal comprising:
a memory; and
at least one processor coupled to the memory and configured to:
communicate with a radio station system comprising one or more radio stations simultaneously on at least one first cell in accordance with a first radio access technology and at least one second cell in accordance with a second radio access technology and used in addition and subordinate to the at least one first cell; and
transmit or receive a control-plane message to or from the radio station system on the at least one second cell when a predetermined condition is satisfied, wherein
the control-plane message includes a non-access stratum (NAS) message or a radio resource control (RRC) message or both, and
the predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

(Supplementary Note 15)

The radio terminal according to Supplementary Note 14, wherein
the predetermined condition relates to the content or type of the control-plane message, and
the at least one processor is configured to receive or transmit the control-plane message on the at least one second cell when the control-plane message comprises: a request for terminal measurement regarding the at least one second cell sent to the radio terminal; or a report on a measurement result regarding the at least one second cell sent from the radio terminal.

(Supplementary Note 16)

The radio terminal according to Supplementary Note 14, wherein
the predetermined condition relates to the content or type of the control-plane message, and
the at least one processor is configured to receive or transmit the control-plane message on the at least one second cell when the control-plane message comprises: a request for terminal information of the radio terminal regarding the second radio access technology sent to the radio terminal; or a report on the terminal information sent from the radio terminal.

(Supplementary Note 17)

The radio terminal according to Supplementary Note 14, wherein
the predetermined condition relates to the content or type of the control-plane message, and
the at least one processor is configured to receive the control-plane message on the at least one second cell when the control-plane message comprises security configuration information about an access stratum (AS) for the at least one second cell.

(Supplementary Note 18)

The radio terminal according to Supplementary Note 14, wherein
the predetermined condition relates to the content or type of the control-plane message, and
the at least one processor is configured to receive or transmit the control-plane message on the at least one second cell when the control-plane message comprises:

a request for access-stratum (AS)-security activation for the at least one second cell sent to the radio terminal; or a response to the request from the radio terminal.

(Supplementary Note 19)

The radio terminal according to Supplementary Note 14, wherein
  the predetermined condition relates to the content or type of the control-plane message, and
  the at least one processor is configured to receive the control-plane message on the at least one second cell when the control-plane message comprises configuration information specific to the second radio access technology.

(Supplementary Note 20)

The radio terminal according to Supplementary Note 14, wherein
  the predetermined condition relates to the type of the signalling radio bearer used to transmit the control-plane message, and
  the at least one processor is configured to receive or transmit the control-plane message on the at least one second cell when the control-plane message is transmitted via a specific signalling radio bearer associated with the second radio access technology.

(Supplementary Note 21)

The radio terminal according to Supplementary Note 14, wherein
  the predetermined condition relates to a transmission cause of the control-plane message, and
  the at least one processor is configured to transmit the control-plane message on the at least one second cell when the control-plane message is transmitted due to degradation of a radio quality of the at least one second cell.

(Supplementary Note 22)

The radio terminal according to Supplementary Note 14, wherein
  the predetermined condition relates to the type of the core network associated with the NAS message, and
  the at least one processor is configured to receive or transmit the control-plane message containing the NAS message on the at least one second cell when the core network is a new type core network associated with introduction of the second radio access technology.

(Supplementary Note 23)

The radio terminal according to any one of Supplementary Notes 14 to 22, wherein the at least one processor is configured to provide Radio Link Control (RLC) and Medium Access Control (MAC) layers to communicate with the radio station system in accordance with the first radio access technology, Radio Link Control (RLC) and Medium Access Control (MAC) layers to communicate with the radio station system in accordance with the second radio access technology, a common Packet Data Convergence Protocol (PDCP) layer associated with both of the two RLC layers, and a common RRC layer associated with the common PDCP layer.

(Supplementary Note 24)

The radio terminal according to any one of Supplementary Notes 14 to 23, wherein
  the first radio access technology is continuous enhancement of LTE and LTE-Advanced, and
  the second radio access technology is a new 5G radio access technology.

(Supplementary Note 25)

A method in a radio terminal, the method comprising:
  communicating with a radio station system comprising one or more radio stations simultaneously on at least one first cell in accordance with a first radio access technology and at least one second cell in accordance with a second radio access technology and used in addition and subordinate to the at least one first cell; and
  transmitting or receiving a control-plane message to or from the radio station system on the at least one second cell when a predetermined condition is satisfied, wherein
  the control-plane message includes a non-access stratum (NAS) message or a radio resource control (RRC) message or both, and
  the predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

(Supplementary Note 26)

A non-transitory computer readable medium storing a program for causing a computer to perform a method in a radio terminal, the method comprising:
  communicating with a radio station system comprising one or more radio stations simultaneously on at least one first cell in accordance with a first radio access technology and at least one second cell in accordance with a second radio access technology and used in addition and subordinate to the at least one first cell; and
  transmitting or receiving a control-plane message to or from the radio station system on the at least one second cell when a predetermined condition is satisfied, wherein
  the control-plane message includes a non-access stratum (NAS) message or a radio resource control (RRC) message or both, and
  the predetermined condition relates to at least one of: (a) a content or type of the control-plane message; (b) a type of a signalling radio bearer used to transmit the control-plane message; (c) a transmission cause of the control-plane message; and (d) a type of a core network associated with the NAS message.

REFERENCE SIGNS LIST

1 RADIO TERMINAL (5G UE)
2 BASE STATION (INTEGRATED eNB)
3 RRH
5 LTE+eNB
6 5G SPECIFIC eNB
41 INTEGRATED EPC
42 5G SPECIFIC EPC
1201 LTE TRANSCEIVER
1203 NEW 5G TRANSCEIVER
1205 BASEBAND PROCESSOR
1206 APPLICATION PROCESSOR
1208 MEMORY
1301 LTE TRANSCEIVER
1303 NEW 5G TRANSCEIVER
1306 PROCESSOR
1307 MEMORY

The invention claimed is:

1. A method in a radio station system including one or more radio stations, the method comprising:
providing, for a radio terminal, one or more first cells in accordance with a first radio access technology of a first radio station and one or more second cells in accordance with a second radio access technology of a second radio station, the one or more second cells being used in addition to the one or more first cells, wherein:
the first radio station and the second radio station use an integrated Medium Access Control (MAC) layer,
the integrated MAC layer has a function related to transmitting and receiving at least one transport block between the integrated MAC layer and a first physical (PHY) layer in accordance with the first radio access technology, and transmitting and receiving at least one transport block between the integrated MAC layer and a second physical (PHY) layer in accordance with the second radio access technology, and
the integrated MAC layer transmits and receives a data by using a Carrier Aggregation (CA) function using the one or more first cells and the one or more second cells or a technology improving the CA function.

2. The method according to claim 1, wherein:
the first radio station includes the integrated MAC layer and the first PHY layer, and
the second radio station includes the second PHY layer.

3. The method according to claim 1, wherein the integrated MAC layer is a single MAC entity.

4. The method according to claim 2, wherein the integrated MAC layer is a single MAC entity.

5. A radio station system comprising:
a first radio station configured to:
provide, for a radio terminal, one or more first cells in accordance with a first radio access technology of the first radio station, and
a second radio station configured to:
provide, for the radio terminal, one or more second cells in accordance with a second radio access technology of the second radio station, the one or more second cells being used in addition to the one or more first cells, wherein:
the first radio station and the second radio station use an integrated Medium Access Control (MAC) layer,
the integrated MAC layer has a function related to transmitting and receiving at least one transport block between the integrated MAC layer and a first physical (PHY) layer in accordance with the first radio access technology, and transmitting and receiving at least one transport block between the integrated MAC layer and a second physical (PHY) layer in accordance with the second radio access technology, and
the integrated MAC layer transmits and receives a data by using a Carrier Aggregation (CA) function using the one or more first cells and the one or more second cells or a technology improving the CA function.

6. A method in a radio terminal, the method comprising:
communicating with a radio station system comprising one or more radio stations on one or more first cells in accordance with a first radio access technology and one or more second cells in accordance with a second radio access technology, the one or more second cells being used in addition to the one or more first cells; and
using an integrated Medium Access Control (MAC) layer, wherein:
the integrated MAC layer has a function related to transmitting and receiving at least one transport block between the integrated MAC layer and a first physical (PHY) layer in accordance with the first radio access technology, and transmitting and receiving at least one transport block between the integrated MAC layer and a second physical (PHY) layer in accordance with the second radio access technology, and
the integrated MAC layer transmits and receives a data by using a Carrier Aggregation (CA) function using the one or more first cells and the one or more second cells or a technology improving the CA function.

7. The method according to claim 6, wherein the common MAC layer is a single MAC entity.

8. A radio terminal comprising:
a memory; and
at least one processor coupled to the memory and configured to:
communicate with a radio station system comprising one or more radio stations on one or more first cells in accordance with a first radio access technology and one or more second cells in accordance with a second radio access technology, the one or more second cells being used in addition to the one or more first cells; and
use an integrated Medium Access Control (MAC) layer, wherein:
the integrated MAC layer has a function related to transmitting and receiving at least one transport block between the integrated MAC layer and a first physical (PHY) layer in accordance with the first radio access technology, and transmitting and receiving at least one transport block between the integrated MAC layer and a second physical (PHY) layer in accordance with the second radio access technology, and
the integrated MAC layer transmits and receives a data by using a Carrier Aggregation (CA) function using the one or more first cells and the one or more second cells or a technology improving the CA function.

* * * * *